United States Patent [19]

Yu

[11] Patent Number: 5,742,503

[45] Date of Patent: Apr. 21, 1998

[54] USE OF SATURATION RELAY FEEDBACK IN PID CONTROLLER TUNING

[75] Inventor: Cheng-ching Yu, Taipei, Taiwan

[73] Assignee: National Science Council, Taipei, Taiwan

[21] Appl. No.: 622,432

[22] Filed: Mar. 25, 1996

[51] Int. Cl.$^6$ .......................... G05B 11/42; G05B 13/02
[52] U.S. Cl. .................. 364/162; 364/157; 364/160; 364/161; 364/163; 395/903; 395/906
[58] Field of Search .................................. 364/148–149, 364/150–152, 157–158, 161–165, 176–177, 553; 318/609–611, 615; 395/906, 903

[56] References Cited

U.S. PATENT DOCUMENTS

| | | | |
|---|---|---|---|
| Re. 33,267 | 7/1990 | Kraus | 364/158 |
| 3,633,083 | 1/1972 | Teodorescu | 318/225 R |
| 4,214,300 | 7/1980 | Barlow et al. | 364/105 |
| 4,549,123 | 10/1985 | Haegglund et al. | 364/157 |
| 4,602,326 | 7/1986 | Kraus | 364/158 |
| 4,754,391 | 6/1988 | Suzuki | 364/157 |
| 4,836,319 | 6/1989 | Haseda et al. | 180/142 |
| 5,124,626 | 6/1992 | Thoen | 364/161 |
| 5,222,022 | 6/1993 | Adams et al. | 364/431.07 |
| 5,223,778 | 6/1993 | Svarovsky et al. | 364/157 |
| 5,229,699 | 7/1993 | Chu et al. | 364/162 |
| 5,283,729 | 2/1994 | Lloyd | 364/157 |
| 5,311,421 | 5/1994 | Nomura et al. | 364/157 |
| 5,325,288 | 6/1994 | Satou | 364/162 |
| 5,396,415 | 3/1995 | Konar et al. | 364/162 |
| 5,412,557 | 5/1995 | Lauw | 363/37 |
| 5,453,925 | 9/1995 | Wojsznis et al. | 364/157 |
| 5,535,117 | 7/1996 | Hiroi | 364/158 |
| 5,568,377 | 10/1996 | Seem et al. | 364/157 |
| 5,587,899 | 12/1996 | Ho et al. | 364/157 |
| 5,625,751 | 4/1997 | Brandwajn et al. | 395/22 |

OTHER PUBLICATIONS

Chiang et al., 1992, Derivation of Transfer Function from Relay Feedback Systems. Ind. Eng. Chem. Res. 31, 855–860.

Chiang et al., 1993, Monitoring procedure for Intelligent Control: On-Line Identification of Maximum Closed-Loop Log Modules. Ind. Eng. Chem. Res. 32.

Haegglund et al., 1991, Industrial Adaptive Controllers Based on Frequency Response Techniques. Automatica 27, 599–609.

Li et al., 1991, An Improved Autotune Identification Method. Ind. Eng. Chem. Res. 30, 1530–1541.

Lin et al., 1993, Automatic Tuning and Gain Scheduling for PH Control. Chem. Eng. Sci. 48, 3159–3171.

Loh et al., 1994, Describing Function Matrix for Multivariable Systems and Its Use in Multiloop PI Design. J. Proc. Control 4, 115–120.

(List continued on next page.)

*Primary Examiner*—Emanuel T. Voeltz
*Assistant Examiner*—Cuong H. Nguyen
*Attorney, Agent, or Firm*—Madson & Metcalf

[57] ABSTRACT

A method and an apparatus are provided for autotuning a parameter of a PID controller which is employed in a transfer function. The method includes steps of (a) providing a first specific value for the transfer function; (b) computing a first ultimate parameter of the transfer function in response to the first specific value; (c) modifying the first specific value in response to the first ultimate parameter in order to obtain a second specific value; (d) generating a second ultimate parameter for a characteristic of the transfer function in a specified range in response to the second specific value; (e) obtaining a precise parameter of the PID controller in response to the second ultimate parameter. The autotuning apparatus includes; a controlled device outputting a first ultimate parameter and a second ultimate parameter, respectively in response to a first input signal and a second input signal; a nonlinear element connected to the controlled device, and outputting a first specific signal and a second specific signal in response to a first ultimate parameter; and a control unit connected to the nonlinear element, wherein the nonlinear element outputs the second input signal to cause the controlled device to output to the PID controller the second ultimate parameter for a specific characteristic of the controlled device in a specific range in order to obtain a precise parameter for the PID controller.

47 Claims, 18 Drawing Sheets

OTHER PUBLICATIONS

Luyben et al., 1987, Derivation of Transfer Functions For Highly Nonlinear Distillation Columns. Ind. Eng. Chem. Res. 26, 2490–2495.

Luyben et al., 1994, Non–linear Autotune Identification. Int. J. Control 59, 595–626.

Papastathopoulou et al., 1990, Tuning Controllers on Distillation Columns with Distillate–Bottoms Structure. Ind. Eng. Chem. Res. 29, 1859–1868.

Shen et al., 1992, Indirect Feedforward Control: Multivariable Systems. Chem. Eng. Sci. 47, 3085–3097.

Shen et al., 1994, Use of Relay–Feedback Test for Automatic Tuning of Multivariable Systems. AIChE J. 40, 627–646.

Wood et al., 1973., Terminal Composition Control of A Binary Distillation Column. Chem. Eng. Sci. 28, 707–720.

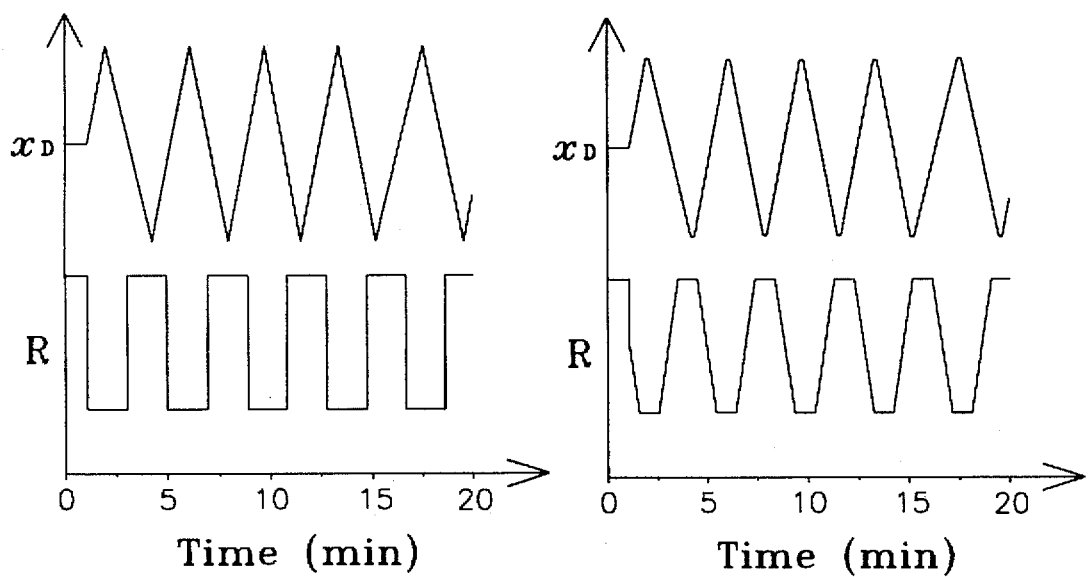
Fig. 7(A)
Fig. 7(B)
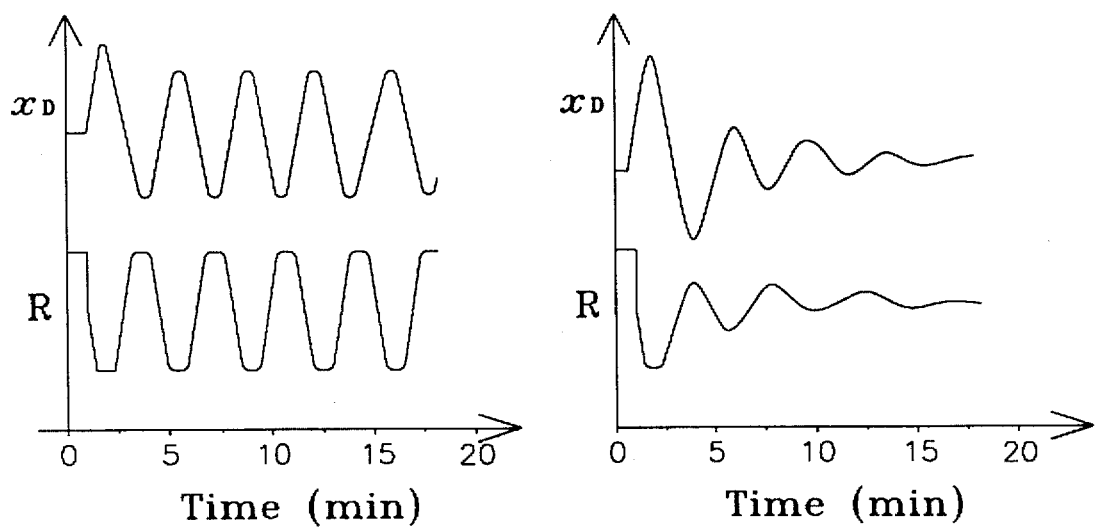
Fig. 7(C)
Fig. 7(D)

USE OF SATURATION RELAY FEEDBACK IN PID CONTROLLER TUNING

FIELD OF THE INVENTION

Despite the success of relay feedback system in autotune identification, it is well known that an ideal (on-off) relay based identification can lead to significant errors in the ultimate gain ($K_u$) and ultimate frequency ($\omega_u$). Instead of taking remedial action after relay feedback experiments, an approach is taken to re-design the experiment such that better estimates of $K_u$ and $\omega_u$ can be achieved throughout the experiment. In present invention, a saturation-relay is employed instead of the conventional ideal relay. The analyses show that the saturation-relay gives significant improvement in the identification of $K_u$ and $\omega_u$. However, too small a slope in the saturation-relay may also fail to generate sustained oscillation. A procedure is presented and tested on linear and nonlinear systems for system identification and multivariable autotuning. Results show that significant improvement can be achieved using the proposed method while maintaining the simplicity of relay feedback test.

BACKGROUND OF THE INVENTION

Autotuning of PID controllers based on relay feedback tests receives a great deal of attention recently (Luyben, W. L., 1987 Derivation of Transfer Functions for Highly Nonlinear Distillation Columns. *Ind. Eng. Chem. Res.* 26, 2490–2495; Hägglund, T. and Åström, K. J., 1991, Industrial Adaptive Controllers Based on Frequency Response Techniques. *Automatica* 27, 599–609). It identifies the important dynamic information, ultimate gain ($K_u$) and ultimate frequency ($\omega_u$), in a straightforward manner. The success of this type of autotuners lies on the fact that it is simple and reliable. The appealing feature of the relay feedback autotuning has lead to a number of commercial autotuners (Hägglund and Åström, 1991) and industrial applications (Papastathopoulou, H. S. and Luyben, W. L., 1990, Tuning Controllers on Distillation Columns with the Distillate-Bottoms Structure. *Ind. Eng. Chem. Res.* 29, 1859–1868). Extensions of relay feedback systems to monitoring (Chiang, R. C. and Yu, C. C., 1993, Monitoring Procedure for Intelligent Control: On-Line Identification of Maximum Closed-Loop Log Modules. *Ind. Eng. Chem. Res.* 32, 90–99) and nonlinear control (Lin, J. Y. and Yu, C. C., 1993, Automatic Tuning and Gain Scheduling for pH Control. *Chem. Eng. Sci.* 48, 3159–3171; Luyben, W. L. and Eskinat, E., 1994, Non-linear Autotuning Identification. *Int. J Control* 59, 595–626) has been made. Moreover, the autotuning of multi-loop PI controllers has also been proposed (Shen, S. H. and Yu, C. C., 1994, Use of Relay-Feedback Test for Automatic Tuning of Multivariable Systems. *AIChE J.* 40, 627–646; Loh, A. P. and Vasnani, V. U., 1994, Describing Function Matrix for Multivariable Systems and Its Use in Multiloop PI Design. *J Proc. Control* 4, 115–120).

Luyben (1987) pioneers the use of relay feedback tests for system identification. The ultimate gain and ultimate frequency from the relay feedback test are used to fit a typical transfer function (e.g., first-, second- or third-order plus time delay system). This identification procedure is called the ATV method. It was applied successfully to highly nonlinear process, e.g., high purity distillation column. Despite the apparent success of autotune identification, it can lead to signification errors in the ultimate gain and ultimate frequency approximation (e.g., 5–20% error in K., Chiang, R. C., Shen, S. H. and Yu, C. C., 1992, Derivation of Transfer Function from Relay Feedback Systems. *Ind. Eng Chem. Res.* 31, 855–860) for typical transfer functions in process control system. The errors come from the linear approximation (describing function analysis) to a nonlinear element. The square type of output from the relay is approximated with the principal harmonic form the Fourier transform (Antherton, D. P., 1982, Nonlinear Control Engineering. Van Nostrand Reinhod: New York; Chiang et al. 1992) and the ultimate gain is estimated accordingly. Therefore, several attempts have been proposed to overcome this inaccuracy. (Li, W., Eskinat, E. and Luyben, W. L., 1991, An Improved Autotune Identification Method. *Ind. Eng. Chem. Res.* 30, 1530–1541) use two relay tests to improve the estimation of $K_u$ and $\omega_u$. Chiang et al. (1992) employ the concept of discrete time to give a better estimation of $\omega_u$. Notice that, in these attempts, ideal (on-off) relay is employed in these experiments and modifications are made after the experiments completed. Since, the major source of the error comes from sine-wave approximation of a square type of oscillation, a straightforward approach to overcome this inaccuracy is to modify the experiment itself (not to make remedial action afterward). That is to produce a more sine-wave like output by re-design the relay.

The purpose of the present invention is to devise an experimental design in relay-feedback system such that more accurate estimate of ultimate gain and ultimate frequency can be achieved. In this work, saturation-relay is employed. This specification includes: (1) the theory of saturation-relay feedback system; (2) the derivation of the autotune identification procedures; (3) a linear system and a nonlinear distillation column to test the effectiveness of proposed method and (4) extension to applied to MIMO autotuning followed by the conclusion.

References:

(1) Tore Hägglund; Karl J. Åström, "Method and an Apparatus in Tuning A PID-Regulator", U.S. Pat. No. 4,549,123 (1985).

(2) Shin Suzuki; Yokohama, "Method of Determining PID Parameters and an Automatic Tuning Controller Using the Method", U.S. Pat. No. 4,753,391 (1988).

SUMMARY OF THE INVENTION

In accordance with the present invention the notations hereinafter, representing the designated significances used for this specification are described as follows;

a amplitude of limit cycle

D time delay e input of the nonlinear element

G(s) process transfer function $g_{ij}(s)$ the (i, j) entry of process transfer function matrix $g_{ii,CL}(s)$ the (i,i) entry of close-loop transfer function h magnitude of relay output k slope of saturation relay $K_C$ controller gain $K_i$ the i entry of multiloop SISO controller $k_{min}$ critical slope $k_p$ steady-state gain $K_u$ ultimate gain $\hat{K}_u$ estimated ultimate gain N(a) describing function $P_u$ period of limit cycle R reflux flow rate s Laplace transform variable u output to the nonlinear element V vapor boilup flow rate
$X_D$ top component
$X_B$ bottoms component
y process output
a relative volatility
$\lambda_{ii}$ the (i,i) entry of RGA
$\tau_I$ reset time of PI controller
$\omega$ frequency
$\omega_u$ ultimate frequency
$\hat{\omega}_u$ estimated ultimate frequency In accordance with the present invention, a method for autotuning a parameter of a PID controller which is employed in a transfer function, comprising steps of (a) providing a first specific value for a transfer function; (b) computing a first ultimate parameter of the transfer function in response to the first specific value; (c) modifying the first specific value in response to the first ultimate parameter in order to obtain a second specific value; (d) generating a second ultimate parameter for a characteristic of the transfer function in a specified range in response to the second specific value; (e) obtaining a precise parameter of a PID controller in response to the second ultimate parameter.

In accordance with another aspect of the present invention, the transfer function is denoted by G(s), which is a function obtained by Laplace-transformation and defined in a frequency domain.

In accordance with another aspect of the present invention, the first specific value is an amplitude of a square-wave, which is generated from a first nonlinear element.

In accordance with another aspect of the present invention, a first nonlinear element is an on/off relay.

In accordance with another aspect of the present invention, the first ultimate parameter includes by a rough ultimate gain and a rough ultimate frequency of said transfer function.

In accordance with another aspect of the present invention, the first ultimate parameter is obtained according to a continuous cycling calculation.

In accordance with another aspect of the present invention, the second specific value is an amplitude of a sine-wave-like wave, which is generated from a second nonlinear element.

In accordance with another aspect of the present invention, the second nonlinear element is a saturation relay.

In accordance with another aspect of the present invention, a sine-wave-like wave is obtained by appropriate selecting a slope of a ramp portion of a signal.

In accordance with another aspect of the present invention, the slope is less than a bounded value $K_{max}$ in order to make a performance of said saturation relay different from that of said on/off relay.

In accordance with another aspect of the present invention, the saturation relay is described by a describing function N(a).

In accordance with another aspect of the present invention, the second ultimate parameter is obtained by employing the describing function N(a).

In accordance with another aspect of the present invention, the describing function is obtained by employing a first term coefficient of a Fourier expansion.

In accordance with another aspect of the present invention, the second ultimate parameter includes a precise ultimate gain and a precise ultimate frequency of the transfer function.

In accordance with another aspect of the present invention, the second ultimate parameter is obtained according to a limit cycle calculation.

In accordance with another aspect of the present invention, a period of the limit cycle is $P_u$.

In accordance with another aspect of the present invention, a first existing condition for the limit cycle is $1+G(j\omega)N(a)=0$.

In accordance with another aspect of the present invention, a second existing condition for the limit cycle is that the slope of said sine-wave-like wave generated from the saturation relay is greater than a value $K_{min}$.

In accordance with another aspect of the present invention, the first ultimate parameter of the transfer function is transmitted to the second nonlinear element by employing a signal feed-back means.

In accordance with another aspect of the present invention, the second ultimate parameter of the transfer function is transmitted to the PID controller by employing a signal feed-back means.

In accordance with another aspect of the present invention, the sine-wave-like wave generated from the saturation relay is transmitted to the transfer function and the precise ultimate gain and the precise ultimate frequency of the transfer function are obtained according to the limit cycle calculation.

In accordance with another aspect of the present invention, a switching apparatus is employed for switching from causing a feedback by the first ultimate parameter of the transfer function to the nonlinear element into causing a feedback by the second ultimate parameter to the PID controller.

In accordance with another aspect of the present invention, the switching apparatus is also employed for the transfer function in order to replace the first specific value by the second specific value.

In accordance with another aspect of the present invention, the first specific value and the second specific value are represented by the square-wave and the sin-wave-like wave, respectively.

In accordance with another aspect of the present invention, wherein characterized in that an intersection c located at negative real axis of a complex-plane as shown in FIG. 6, is obtained by intersecting the locus of G(jω) derived from the transfer function G(s) with a locus of −1/N(a) derived from the description function N(a).

In accordance with another aspect of the present invention, the specified range is that the gain locus of |G(jω)| function has to enclose a starting point b of the −1/N(a) locus located at negative real axis of the complex-plane as shown in FIG. 6.

In accordance with another aspect of the present invention, the first ultimate parameter obtained by computation is used as a reference in order to compute the second ultimate parameter.

In accordance with another aspect of the present invention, it also can be used for a system identification.

In accordance with the present invention, an autotuning apparatus used to modulate a parameter of a PID controller which is employed for controlling a controlled device, comprising; a controlled device outputting a first ultimate parameter and a second ultimate parameter, respectively in response to a first input signal and a second input signal; a nonlinear element connected to said controlled device, and outputting a first specific signal and a second specific signal in response to a first ultimate parameter; and a control unit connected to the nonlinear element, and by means of said nonlinear element outputting the second input signal to cause the controlled device to output to the PID controller the second ultimate parameter for a specific characteristic of the controlled device in a specific range in order to obtain a precise parameter for the PID controller.

In accordance with another aspect of the present invention, the controlled device is a device used in a chemical distillation process.

In accordance with another aspect of the present invention, the first input signal is a square-wave signal which is generated form the nonlinear element.

In accordance with another aspect of the present invention, the nonlinear element is an on/off relay.

In accordance with another aspect of the present invention, the second input signal is a sine-wave-like signal which is generated from the nonlinear element.

In accordance with another aspect of the present invention, the nonlinear element is a saturation relay.

In accordance with another aspect of the present invention, the first ultimate parameter includes a rough ultimate gain and a rough ultimate frequency.

In accordance with another aspect of the present invention, the rough ultimate gain and the rough ultimate frequency are obtained according to a continuous cycling calculation.

In accordance with another aspect of the present invention, the second ultimate parameter includes a precise ultimate gain and a precise ultimate frequency.

In accordance with another aspect of the present invention, the second ultimate parameter is obtained according to a limit cycle calculation.

In accordance with another aspect of the present invention, the sine-wave-like signal generated from the saturation relay is transmitted to the controlled device and the precise ultimate gain and the precise ultimate frequency of the controlled device are obtained according to the limit cycle calculation.

In accordance with another aspect of the present invention, the first ultimate parameter of the controlled device is transmitted to the nonlinear element by a signal feed-back apparatus.

In accordance with another aspect of the present invention, the second ultimate parameter of said controlled device is transmitted to the nonlinear element by a signal feed-back apparatus.

In accordance with another aspect of the present invention, a switching apparatus is employed for switching from causing a feedback by the first ultimate parameter of the controlled device to the nonlinear element into causing a feedback by the second ultimate parameter to said PID controller.

In accordance with another aspect of the present invention, the switching apparatus is also employed for the controlled device in order to replace the first specific signal by the second specific signal.

In accordance with another aspect of the present invention, the first specific signal and the second specific signal are represented by the square-wave signal and the sine-wave-like signal, respectively.

In accordance with another aspect of the present invention, wherein being characterized in that an intersection c located at negative real axis of a complex-plane as shown in FIG. 6, is obtained by intersecting the locus of $G(j\omega)$ derived from the controlled device with a locus of $-1/N(a)$ derived from the describing function $N(a)$, wherein $G(j\omega)$ is the transfer function of the controlled device and $N(a)$ is a describing function employed for the nonlinear element.

In accordance with another aspect of the present invention, the specified range is that the locus of $G(j\omega)$ has to enclose a starting point b of said $-1/N(a)$ locus located at the negative real axis of a complex-plane as shown in FIG. 6.

In accordance with another aspect of the present invention, the autotuning apparatus is implemented one selected from a group consisting of a distributed control system (DCS), a single station controller, and a microcomputer control.

The present invention may be understood through the following description with reference to the accompanying drawings, in which:

BRIEF DESCRIPTION OF THE DRAWINGS AND TABLES

FIG. 1. Nonlinear feedback system

FIGS. 2A and 2B. Input-output relationship for ideal (on-off) relay

FIGS. 3A and 3B. Input-output relationship for saturation relay

FIG. 4. Graphical interpretation of the angle $\gamma$

FIGS. 5A, 5B, and 5C. The wave shape of output to the nonlinear element for different slope FIG. 6. Loci of $G(j\omega)$ and $-1/N(a)$ FIGS. 7A, 7B, 7C, and 7D. Relay feedback test for example 1: (7A) ideal relay ($k\to\infty$), (7B) saturation relay ($k=5$), (7C) saturation relay ($k=k_{min}=2.1$), (7D) saturation relay ($k=1.5<k_{min}$)

FIG. 8A. Percent error in $K_u$ for first order plus dead time system ($e^{-Ds}/(\tau s+1)$) with different values of $D/\tau$ FIG. 8B. Percent error in $\omega_u$ for first order plus dead time system ($e^D/(\tau s+1)$) with different values of $D/\tau$ FIG. 9A. Percent error in $K_u$ for example 2

FIG. 9B. Percent error in $\omega_u$ for example 2

FIG. 10A. Percent error in $K_u$ for example 3

FIG. 10B. Percent error in $\omega_u$ for example 3

FIG. 11. Proposed autotune identification procedure for WB column

FIG. 12. R–V controller moderate-purity distillation column

FIG. 13. Proposed autotune identification procedure in $x_B$–V loop for moderate-purity distillation column FIG. 14. MIMO autotuning process FIGS. 15A and 15B. Bode diagram for moderate-purity distillation column: $g_{11,CL}$ FIGS. 15C and 15D. Bode diagram for moderate-purity distillation column: $g_{22,CL}$ FIG. 16. Load responses for ±20% feed composition changes FIG. 17. Nonlinear feedback system according to the present invention.

DETAILED DESCRIPTION OF THE PREFERRED EMBODIMENT

Analysis

1. Conventional approach: ideal (on-off) relay

Figure 1:
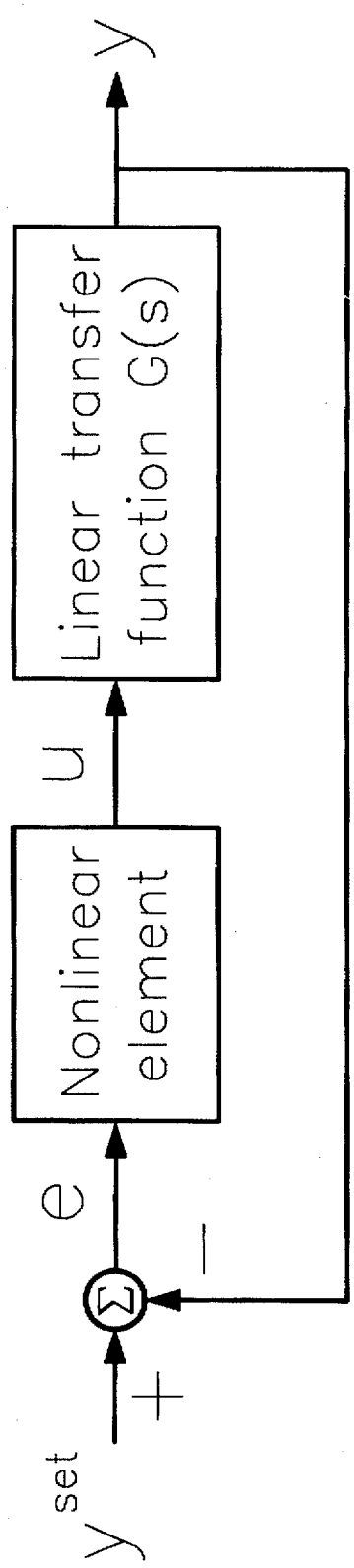
Figure 2A:
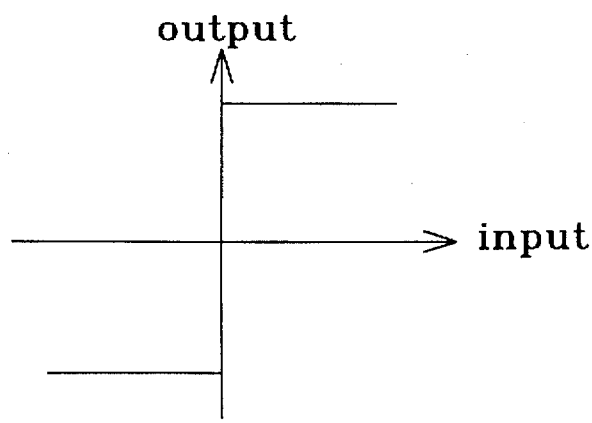
Figure 2B:
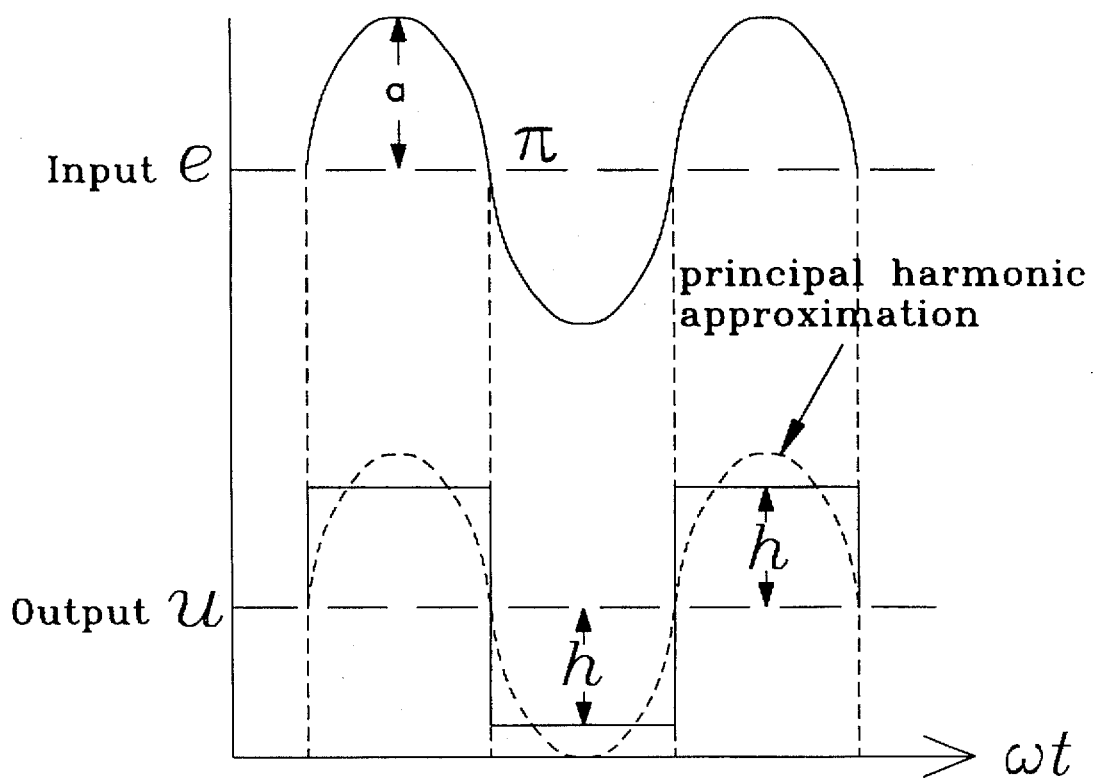

Autotuning based on relay feedback can be analyzed via a block diagram. Consider a feedback system (FIG. 1) where $G(s)$ is a linear transfer function. If the input signal ($e(t)$) to the nonlinear element is a sinusoidal wave:

$$e(t)=a \sin \omega t \qquad (1)$$

where a is the magnitude of sinusoidal wave, the output signal (u(t)) of the nonlinear element is a square wave (FIGS. 2A and 2B). Since most control system analyses are based on linear theory, Fourier transformation is useful in this regard. The output of the nonlinear element can be expressed as:

$$u(t) = A_0 + \sum_{n=1}^{\infty} A_n \cos n\omega t + B_n \sin n\omega t \quad (2)$$

where $$A_0 = \frac{1}{2\pi} \int_0^{2\pi} u(t) d(\omega t) \quad (3)$$

$$A_n = \frac{1}{\pi} \int_0^{2\pi} u(t) \cos n\omega t d(\omega t) \quad (4)$$

$$B_n = \frac{1}{\pi} \int_0^{2\pi} u(t) \sin n\omega t d(\omega t) \quad (5)$$

Because the output (u(t)) is an odd-symmetric function (i.e., N(a) is unbiased and symmetric to the origin), the coefficients $A_0$ and $A_n$ are equal to zero (i.e., $A_0=0$ and $A_n=0$ $\forall n$). Therefore, eq 2 becomes:

$$u(t) = \sum_{n=1}^{\infty} B_n \sin n\omega t \quad (6)$$

Furthermore, if an ideal relay is employed (FIGS. 2A and 2B), then the coefficients $B_n$ become:

$$B_n = \begin{cases} \frac{1}{n} \frac{4h}{\pi} , & n = 1,3,5 \ldots \\ 0 , & n = 2,4,6 \ldots \end{cases} \quad (7)$$

The describing function analysis provides a tool for frequency domain analysis for this nonlinear system. Only the principal harmonic is employed for the linear equivalence. That is only the first Fourier coefficient is used for frequency domain analysis. Therefore, the describing function is:

$$N(a) = \frac{B_1 + jA_1}{a} \quad (8)$$

for the ideal relay, since $A_1=0$ and $B_1=4h/\pi$, we have:

$$N(a) = \frac{4h}{\pi a} \quad (9)$$

Since sustained oscillation is generated from a relay feedback test (e.g., FIGS. 2A and 2B), this frequency corresponds to the limit of stability. That is:

$$1 + G(j\omega_u)N(a) = 0 \quad (10)$$

or the ultimate gain ($K_u$) becomes:

$$\begin{aligned} K_u &= -\frac{1}{|G(j\omega_u)|} \\ &= N(a) \\ &= \frac{4h}{\pi a} \end{aligned} \quad (11)$$

Part of the success of the autotune identification comes from the fact that $K_u$ and $\omega_u$ can be read directly from the experimental results (e.g., FIG. 2B).

The results of eq 11 clearly indicate that the ultimate gain ($K_u$) is estimated from the amplitude ratio of two sinusoidal waves at a given frequency ($\omega_u$) (i.e., $u(t)=(4h/\pi a)\sin \omega t$ over $e(t)=a \sin \omega t$). Obviously, the output of the relay is a square wave instead of a sinusoidal wave. This leads to erroneous result in the ultimate gain. FIGS. 2A and 2B show the corresponding input-output relationship for an ideal relay. Here, the principal harmonic is used to approximate a square wave (FIG. 2B). Chiang et al. (1992) point out that the truncation of the higher order terms (i.e., n=3, 5, 7, ...) affects the ultimate gain and ultimate frequency estimation. Mathematically, it is difficult to include the high order terms in a linear analysis. Instead of including higher order terms, a straightforward approach is to redesign the relay feedback experiment. In other words, it is helpful to devise an experiment such that the output response of the relay is of more sine-wave-like (less square-wave-like).

2. Alternative: saturation-relay feedback

Figure 3A:
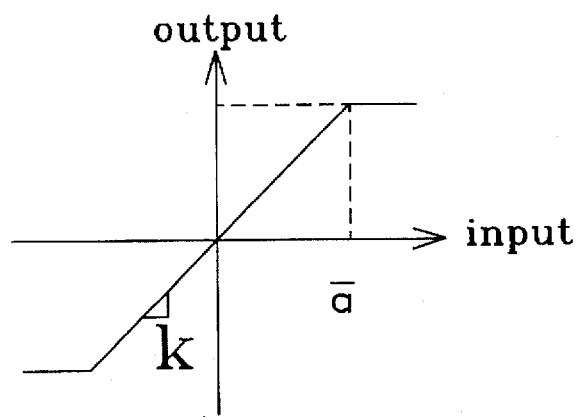
Figure 17:
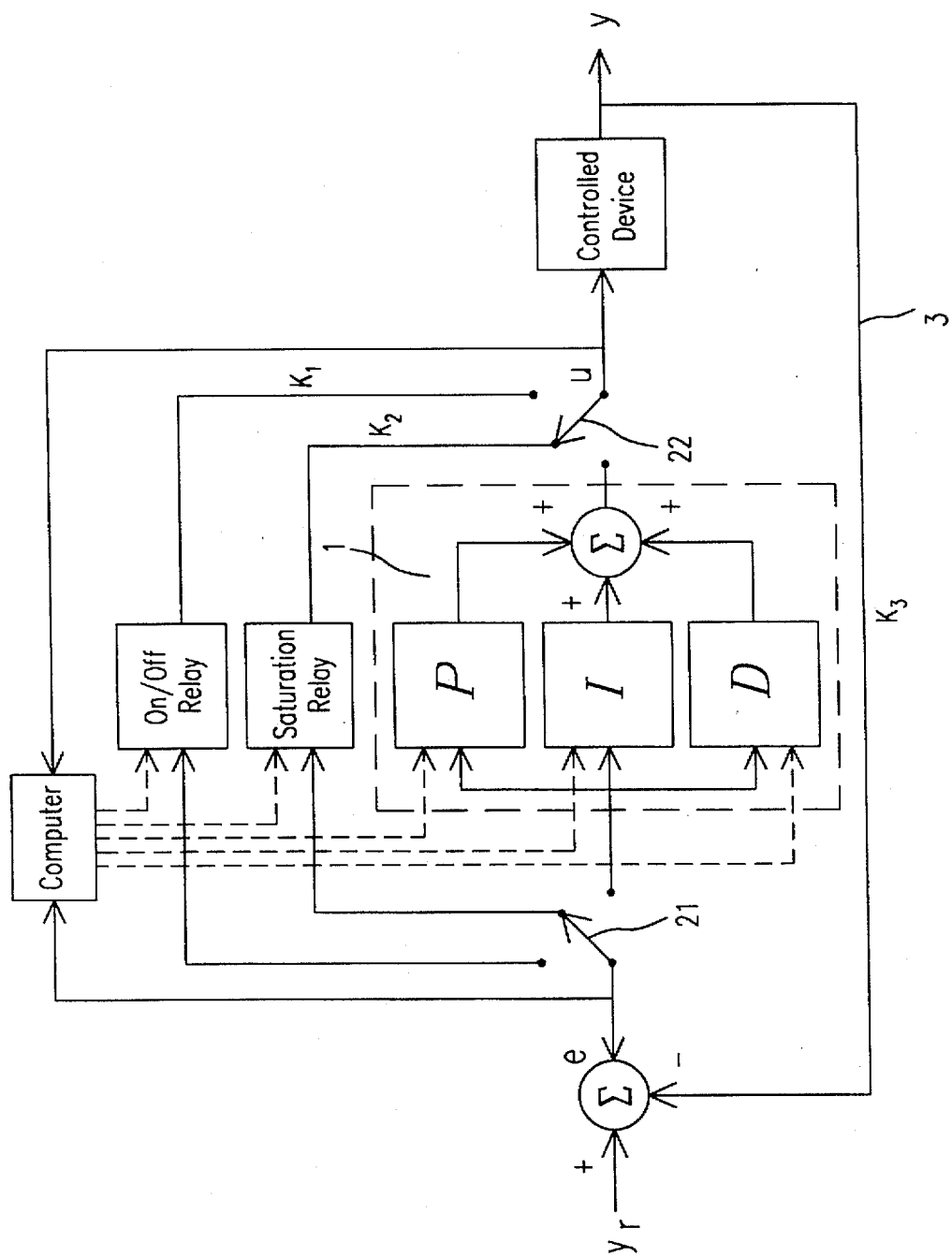

Since the square-wave output (e.g., FIG. 2B) comes from the abrupt change at the zero point (i.e., e(t)=0 in FIG. 2) of an ideal relay, the saturation-relay provides an attractive alternative for a smooth transition around the zero point as shown in FIG. 3A. Autotuning based on relay feedback according to the present invention can be analyzed via a block diagram as shown in FIG. 17. An input signal e is inputted to the on/off relay (first nonlinear element) via the selecting switch 21, and then the on/off relay provides a first specific value $k_1$ to the controlled device via the selecting switch 22. Next, the controlled device generates a first ultimate parameter $k_3$ in response to the first specific value $k_1$. The first ultimate parameter $k_3$ is transmitted to the saturation relay (second nonlinear element) by way of signal feedback line 3 and selecting switch 21. Then, the saturation relay provides a second specific value $k_2$ by modifying the first specific value $k_1$ in response to the first ultimate parameter $k_3$ to the controlled device via the selecting switch 22. Next, the controlled device generates a second ultimate parameter $k_3$ in response to the second specific value $k_2$. The second ultimate parameter $k_3$ is transmitted to the, PID controller 1 by way of signal feedback line 3 and selecting switch 21. The saturation-relay is characterized by two parameters: relay height (h) and a slop (k) (FIG. 3A). Therefore, the input of the relay is limited by a where $$\bar{a} = \frac{h}{k} \quad (12)$$

That is: if the input to the relay is less then $\bar{a}$ ($|e| \leq \bar{a}$), then the output is proportional to the input with a factor k $$u = k \cdot e \quad (13)$$

However, if the input to the relay is greater than $\bar{a}$ ($|e| > \bar{a}$), then the output of the relay is limited by h $$u = h \quad (14)$$

$$u = -h \quad (15)$$

With the saturation-relay inserted in the feedback loop, the output of the relay is of less square-wave-like response for a sine-wave with an upper (or a lower) limit and the height of the output response is limited by h ($h=k\bar{a}$).

Figure 3B:
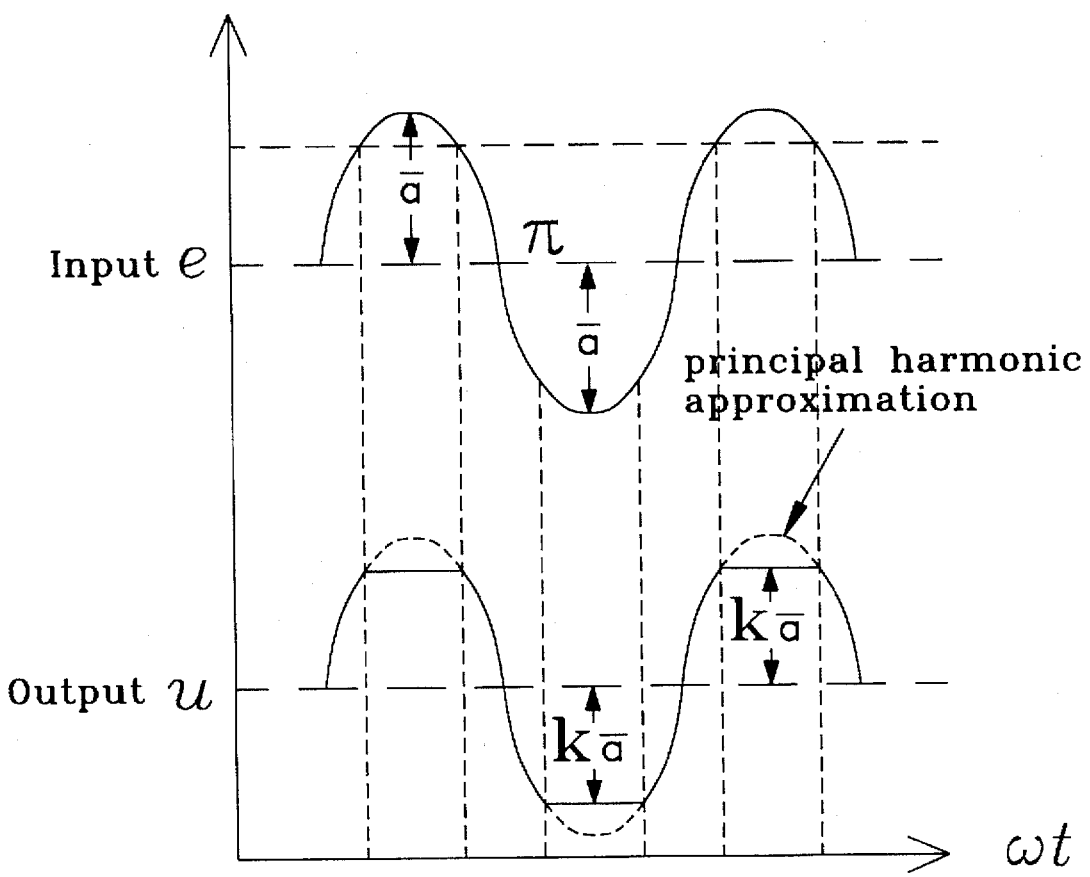

The output of the saturation-relay can be characterized analytically. Consider a saturation-relay feedback system to the nonlinear element be a sinusoidal wave with an amplitude a (FIG. 3B). That is:

$$e(t) = a \sin \omega t \quad (16)$$

The output to the nonlinear element (u(t)) looks like a truncated sinusoidal wave and the closeness of this output response to a sine wave depends a great deal on the slope k chosen. The angle $\gamma$ (FIG. 4) gives a simple measure to characterize the relay output.

$$\gamma = \sin^{-1}\left(\frac{\bar{a}}{a}\right) \tag{17}$$

Figure 4:
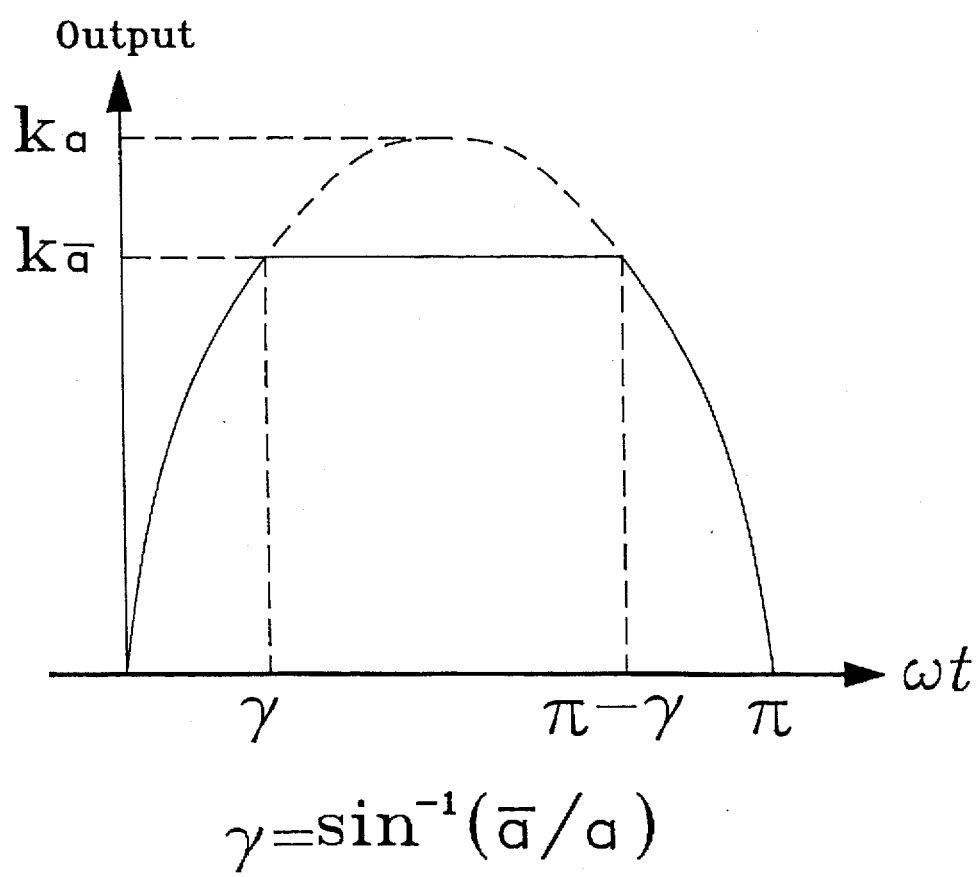

Since the relay output is a periodical function, considering half period, if the phases lies between $\gamma$ and $\pi-\gamma$, the output is equal to h and the sine-wave-like responses remains for $\omega t<\gamma$ and $\omega t>\pi-\gamma$ as shown in FIG. 4. Obviously, the values $\gamma$ depends on the slope k. If $k\to\infty$, we have:

$$\gamma = \lim_{k\to\infty} \sin^{-1}\left(\frac{\left(\frac{h}{k}\right)}{a}\right) = 0 \tag{18}$$

Then, the output becomes a square wave. With this measure, the relay output can be expressed as:

$$u(t) = \begin{cases} \frac{h}{\sin\gamma} \sin\omega t & 0 \leq \omega t < \gamma \text{ and } \pi-\gamma < \omega t \leq \pi \\ h & \gamma \leq \omega t \leq \pi-\gamma \end{cases} \tag{19}$$

Since the principal harmonic is employed for linear approximation, the Fourier transformation of $u(t)$ is useful for the purpose of analysis:

$$u(t) = \sum_{n=1}^{\infty} B_n \sin n\omega t \tag{20}$$

where $$B_n = \frac{2}{\pi} \int_0^{\pi} u(t)\sin n\omega t\, d\omega t \tag{21}$$

Since the term $\gamma$ plays an important role in the frequency domain analysis, the relationship between $\gamma$ and frequency responses is studied. Consider the following cases.

(A) $0<\gamma<\pi/2$ ($\infty>k>h/a$)

for this general case, substituting $u(t)$ (eq 19) into eq 21, we have:

$$B_n = \begin{cases} \frac{2h}{\pi}\left[\frac{1}{\sin\gamma}\left(\frac{\sin(1-n)\gamma}{1-n} - \frac{\sin(1+n)\gamma}{1+n}\right) - \frac{1}{n}(\cos(\pi-\gamma)-\cos\gamma)\right] & ,n=1,3,5\ldots \\ 0 & ,n=2,4,6\ldots \end{cases} \tag{22}$$

The expression for the odd coefficients (e.g., $B_1, B_3, B_5, \ldots$) differs from that of an ideal relay (Chiang et al., 1992) and the even coefficients remain zero. Thus, the describing function becomes:

$$N(a) = \frac{2h}{\pi}\left[\frac{1}{\bar{a}}\sin^{-1}\left(\frac{\bar{a}}{a}\right) + \frac{\sqrt{a^2-\bar{a}^2}}{a^2}\right] \tag{23}$$

Figure 5A:
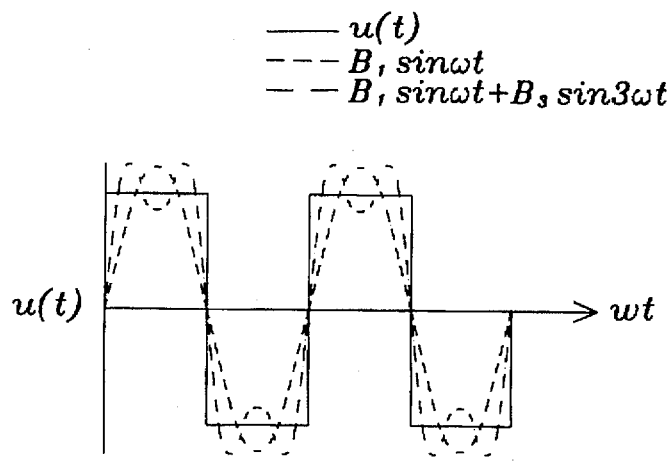
Figure 5B:
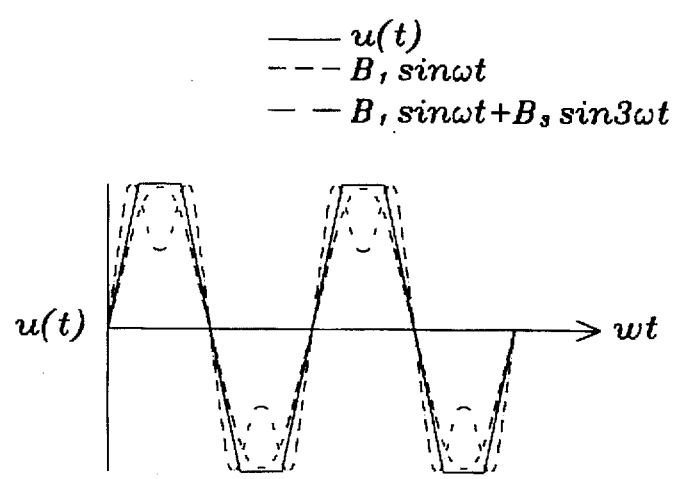
Figure 5C:
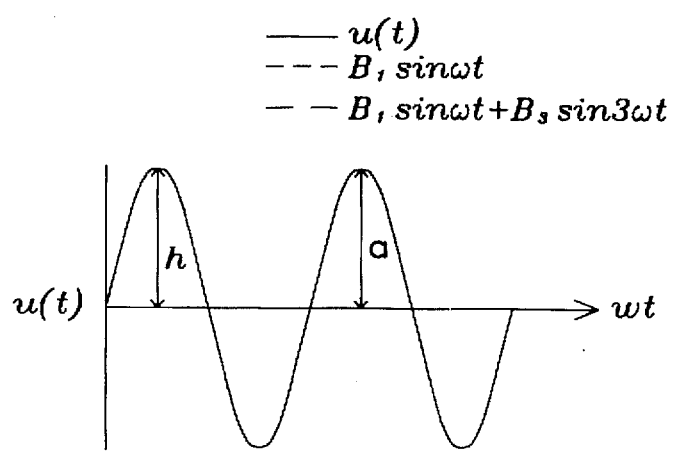

Since the higher order terms (eq 22) are ignored, FIGS. 5A, 5B, and 5C clearly show that the principal harmonic approximation cannot exactly describe the output response (e.g., FIG. 5B wherein $\gamma=\pi/4$).

(B) $\gamma=0$ ($k\to\infty$)

Let us first consider an asymptotic case when the slope of saturation relay approaches infinity (i.e., $k\to\infty$) (FIG. 3A). In this case, $\bar{a}$ becomes zero (eq 12), $\gamma$ becomes zero (eq 16), and, subsequently, the saturation-relay is reduced an ideal relay (FIGS. 2A and 2B). The coefficients ($B_n$) of Fourier expansion can be derived from eq 22. After some algebraic manipulation, we have:

$$B_n = \lim_{\gamma\to 0} \frac{2h}{\pi}\left[\frac{1}{\sin\gamma}\left(\frac{\sin(1-n)\gamma}{1-n} - \frac{\sin(1+n)\gamma}{1+n}\right) - \frac{1}{n}(\cos n(\pi-\gamma)-\cos\gamma)\right] \tag{24}$$

$$= \frac{1}{n}\frac{4h}{\pi}, n=1,3,5,\ldots$$

and $$B_n = 0 \quad n=2,4,6,\ldots$$

Since the principal harmonic ($B_1$) is employed for the describing function analysis, $N(a)$ become:

$$N(a) = \lim_{\bar{a}\to 0} \frac{2h}{\pi}\left[\frac{1}{\bar{a}}\sin^{-1}\left(\frac{\bar{a}}{a}\right) + \frac{\sqrt{a^2-\bar{a}^2}}{a^2}\right] \tag{26}$$

$$= \frac{4h}{\pi a}$$

Again, the principal harmonic approximation cannot exactly describe the output response (e.g., FIG. 5A).

(c) $\gamma=\pi/2$ ($k=h/a$)

Let us consider another asymptotic case. That is the slope is carefully chosen such that $\bar{a}=a$ (or $k=h/a$). In this case, the output of the relay is exactly a sine-wave (e.g., FIG. 5C). Therefore, the Fourier coefficients can be found by substituting $\gamma=\pi/2$ into eq 22. Here, we have:

$$B_n = \begin{cases} h & n=1 \\ 0 & \text{otherwise} \end{cases} \tag{27}$$

For this case, only primary harmonic term exists ($B_1=h$ and $B_n=0$ for $n>2$), the principal harmonic approximation gives exact solution. Thus, the output of the saturation-relay is:

$$u(t) = h\sin\omega t \tag{28}$$

Eq 28 shows that, the saturation-relay gives a pure sinusoidal wave and output lags behind the input by $-180°$.

Obviously, this is exactly the conventional sine-wave test and from the definition, the ultimate gain $K_u$ is:

$$K_u = \frac{h}{a} \tag{29}$$

From the describing function analysis, $N(a)$ can be found by substituting $\gamma=\pi/2$ into eq 23

$$N(a) = \frac{h}{a} \tag{30}$$

Comparing eq 30 with eq 29, it is clear that no approximation is involved in this estimation.

The analyses of these three cases show that the saturation relay is a generalization of the ideal relay. More importantly, better estimates of $K_u$ and $\omega_u$ can be achieved by adjusting the slope of the relay. For example, when $\gamma=0$, we have an ideal relay and as $\gamma$ increases to $\pi/2$ the experiment becomes a conventional sine-wave test. Therefore, it provides the flexibility in finding more accurate $K_u$ and $\omega_u$.

3. Potential problem

The improvement of the estimates of $K_u$ and $\omega_u$ does not come without any potential problem. One possible case is that if the slope is chosen too smaller (or a is smaller than $\bar{a}$), then a limit cycle may not exist. This can be analyzed from frequency responses. Notice that the condition for the existence of sustained oscillation is:

$$1 + G(j\omega)N(a) = 0 \tag{31}$$

or $$G(j\omega) = -\frac{1}{N(a)} \tag{32}$$

Figure 6:
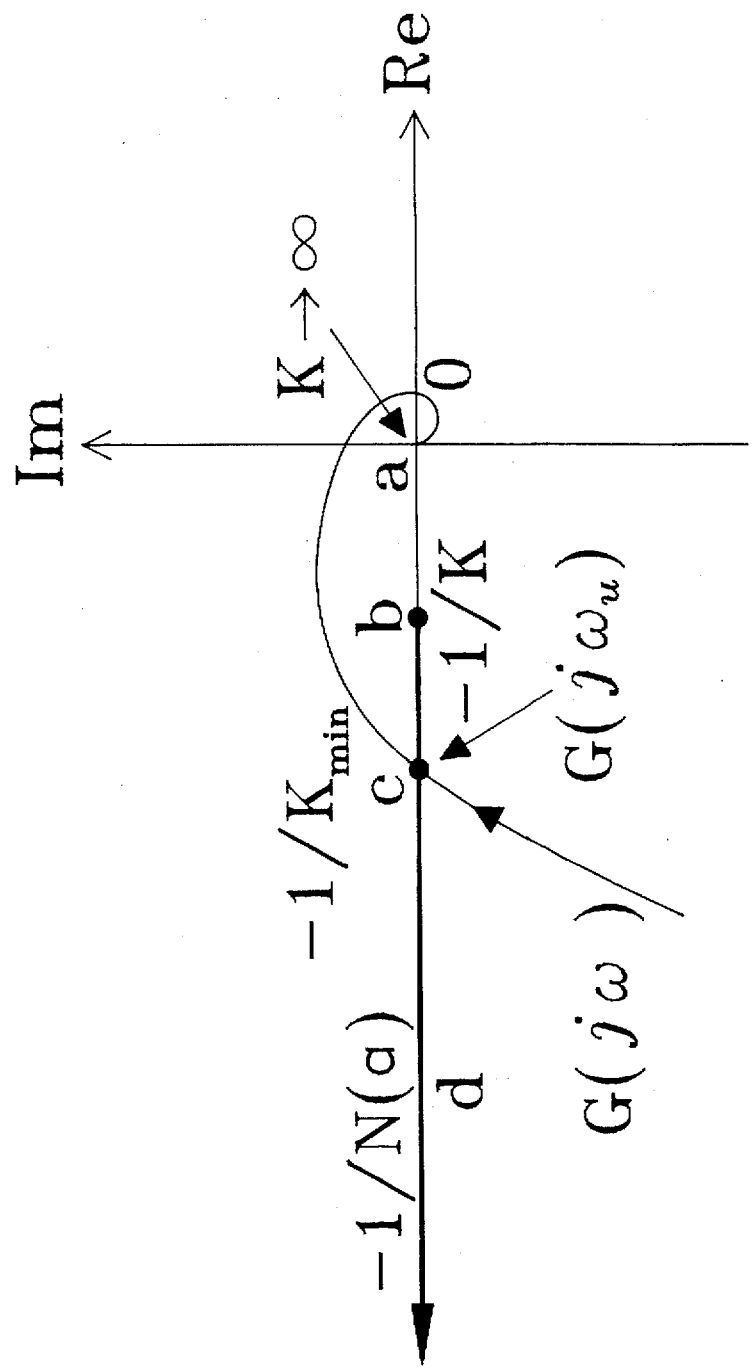

Eq 32 can be solved by plotting and the intersection corresponds to the crossover point ($K_u$ and $\omega_u$). For an ideal relay, the $-1/N$ loci starts from the origin and moves toward $-\infty$ as a increases (e.g., starting from the point "a" toward left in FIG. 6). In terms of a saturation-relay, the starting point of the $-1/N$ loci corresponds to $-1/k$ (FIG. 6). As we decreases the slope, the starting point moves to left gradually. If the starting point moves to "b", we still have an intersection and a limit cycle still exists. However, if the slope is decreased further and the starting point is moved over the point "c", then $-1/N$ will not intersect $G(j\omega)$ any longer and we do not have a limit cycle. Therefore, there exist a critical slope ($k_{min}$) when the slope of the saturation-relay is smaller than this value, the feedback system cannot generate a sustained oscillation. On the other hand, if the slope is chosen too large, the performance of the relay approaches that of an ideal relay and the improvement in the estimate of $K_u$ and $\omega_u$ disappears. Therefore, a tradeoff has to be made in the selection of the slope. Furthermore, this critical slope ($k_{min}$) is related to $|G(j\omega)|$. That is $$k_{min} = \frac{1}{|G(j\omega_u)|} \tag{33}$$

The following example illustrates the tradeoff.

EXAMPLE 1

WB column (Wood and Berry, 1973)

$$G(s) = \frac{x_D}{R} = \frac{12.8e^{-s}}{16.8s + 1}$$

This first order plus dead time system has the following ultimate properties: $K_u = 2.1$ and $\omega_u = 1.608$. If an ideal relay is used ($k \to \infty$), the test gives: $\hat{K}_u = 1.71$ and $\hat{\omega}_u = 1.615$. This test shows an almost $-20\%$ error in the estimate of $K_u$. Furthermore, neither the input ($X_D$) nor the output (R) of the relay shows sine-wave-like responses (FIG. 7A). If the slope k decreases to 5 (this gives $\gamma = 18$), then the system responses behave more sine-wave-like (FIG. 7B) and the estimate of $K_u$ becomes: $\hat{K}_u = 1.94$ (8% error). Obviously, an improvement in the estimate of $K_u$ can be seen using the saturation-relay. If the slope decreases further to the critical slope ($k = k_{min} = 2.1$), the input and output of the relay look exactly like a sine-wave (FIG. 7C) and the estimates becomes: $\hat{K}_u = 2.098$ and $\hat{\omega}_u = 1.607$. These are almost exact value for $K_u$ and $\omega_u$. However, if the slope is chosen to be less than $k_{min}$ (e.g., $k=1.5$), then the relay fails to generate sustained oscillation.

The above example clearly indicates that the saturation-relay can improve the estimation of ultimate gain and ultimate frequency. However, attention has to be paid in the selection of the slope (k).

Autotune Identification

4. Selection of the slope of saturation relay

As mentioned earlier, a critical slope ($k_{min}$) exists to indicate the success/failure of a relay feedback test. Furthermore, this critical slope is system dependent (eq 29). Qualitatively, we also understand that the smaller the slope (k) is the more accurate estimate of $K_u$ and $\omega_u$, can be achieved provided with the assumption that the test is successful. However, in a relay feedback test a quantitative value of the slope should be given.

Figure 8A:
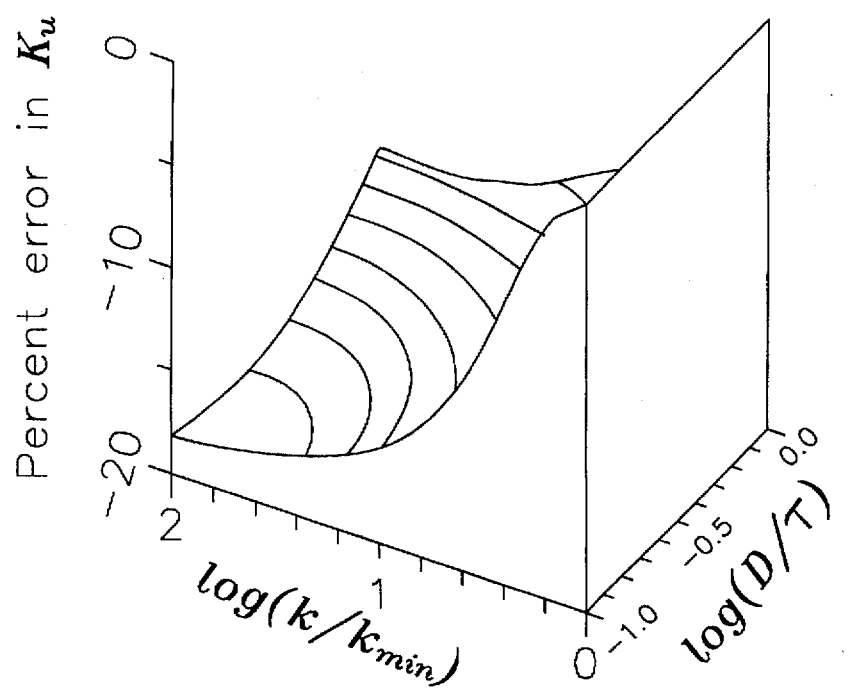
Figure 8B:
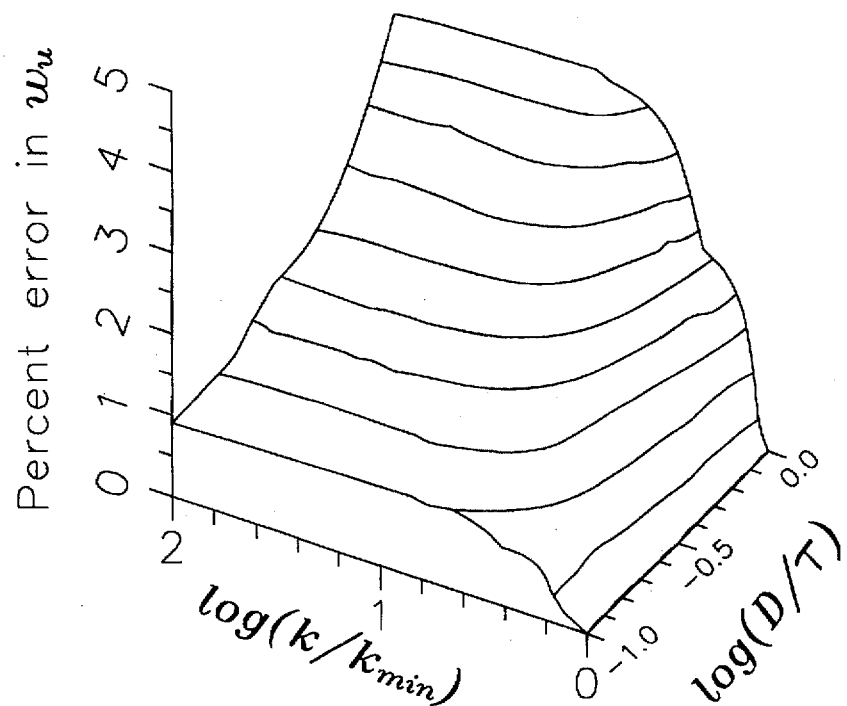

In order to determine the slope, the typical process transfer function for chemical processes is used to illustrate the tradeoff between success of an experiment and accuracy of the estimate. Consider a transfer function of the form:

$$G(s) = \frac{e^{-Ds}}{\tau s + 1} \tag{34}$$

where D is the dead time and $\tau$ is the time constant. A range of $D/\tau$ is studied for different value of dimensionless slope ($k/k_{min}$) and, subsequently, percent errors in $K_u$ and $\omega_u$ are evaluated. Results (FIGS. 8A and 8B) show that the improvement in the estimate levels off as k approaches 10 times of $k_{min}$ (i.e., $k=10 k_{min}$). Furthermore, the error in $K_u$ ranges from $-10\%$ to $-20\%$ for these first order plus dead time systems with an ideal relay ($k \to \infty$) and the experiments tend to underestimate $K_u$. several things become apparent immediately. First, generally, the slope should be less than $10 k_{min}$ in order to improve the estimates. Second, it is preferably to choose the slope at least $1.4 k_{min}$ to avoid unsuccessful relay feedback test ($k_{min} = K_u = 1/|G(j\omega_u)|$). Therefore, a simple value of thumb is to select the slope as "1.4" times of $k_{min}$. Notice that this is a safety factor for a class of transfer function over a range of parameter space, for a given system, the true safety factor is actually system dependent as shown in FIGS. 8A and 8B. In order to test the validity of this proposal. Consider a second order example.

EXAMPLE 2

$$G(s) = \frac{37.7e^{-10s}}{(7200s + 1)(2s + 1)}$$

Figure 9A:
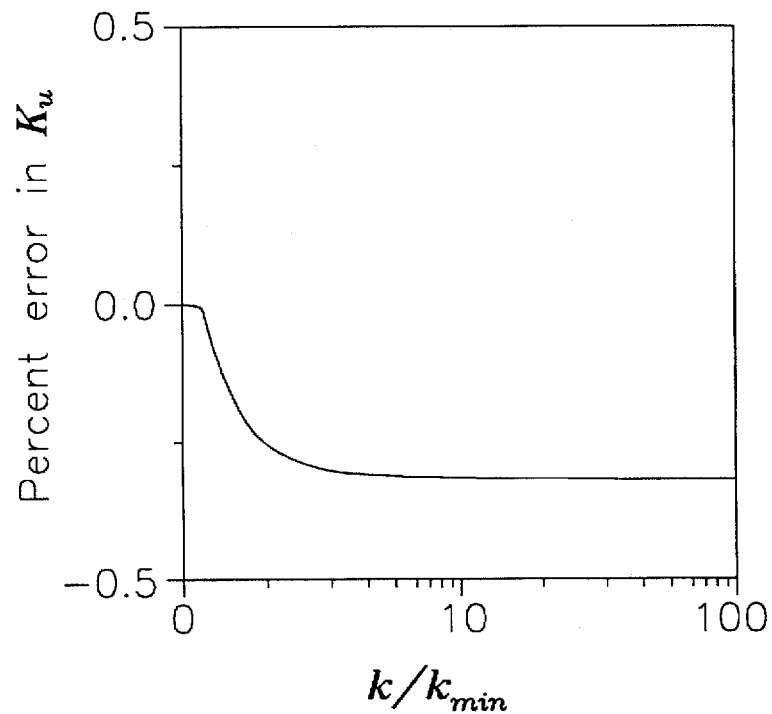
Figure 9B:
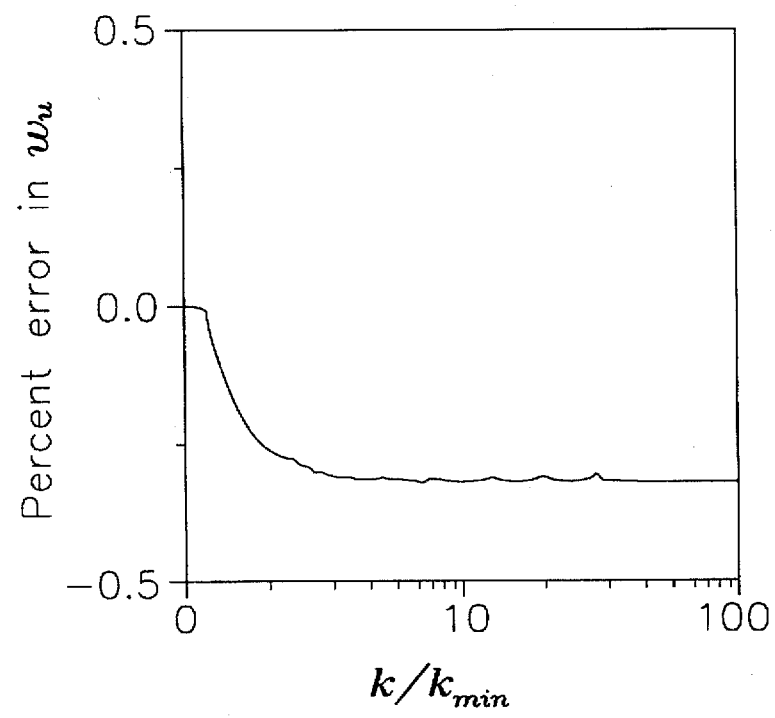

For this system, the exact values for $K_u$ and $\omega_u$ are: 26.24 and 0.1315. For an ideal relay ($k \to \infty$), the ultimate gain found is: 23.15. This corresponds to $-11.7\%$ error in $K_u$. As we decrease the slope to $k_{min}$, almost exact value of $K_u$ can be found ($K_u = 26.04$) (FIG. 9). Furthermore, for $k=1.4 k_{min}$, we can generate sustained oscillation with an improved estimate in both $K_u$ and $\omega_u$ (FIG. 9).

EXAMPLE 3

$$G(s) = \frac{-(10s + 1)e^{-s}}{(2s + 1)(4s + 1)}$$

Figure 10A:
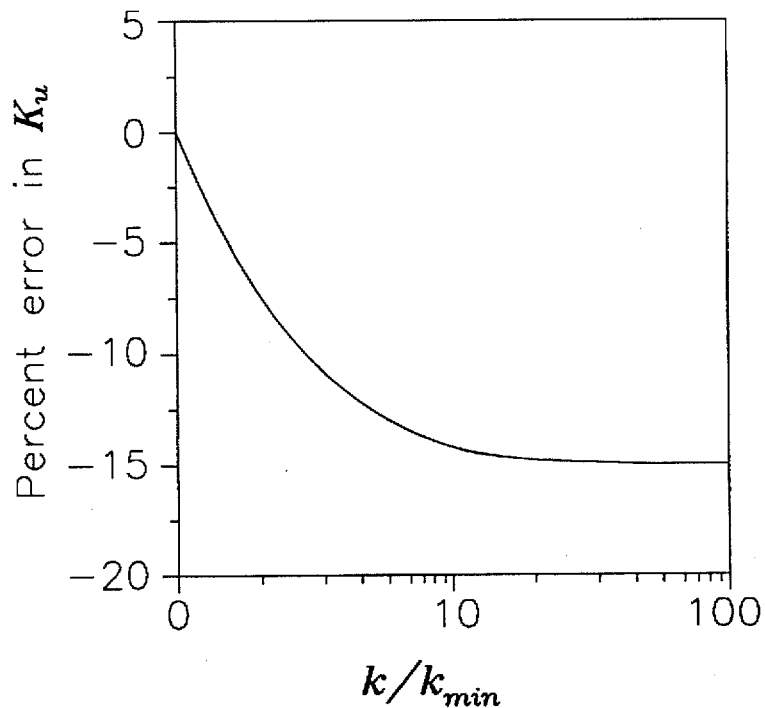
Figure 10B:
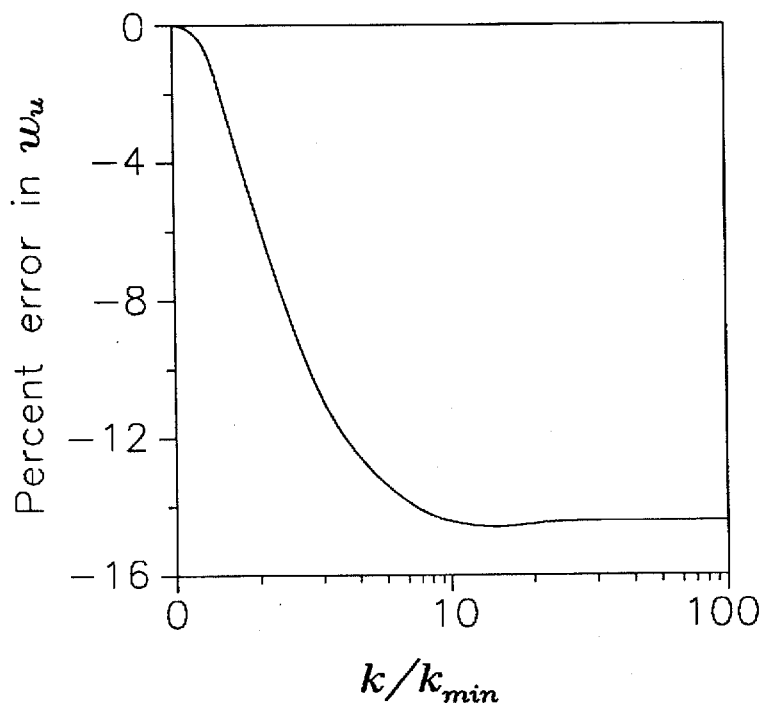

This is a system with inverse response (Shen et al., 1994). The exact values for $K_u$ and $\omega_u$ are: 0.576 and 0.336. When an ideal relay is employed in the relay feedback test, the percent errors in $K_u$ and $\omega_u$ is $-15.8\%$ and $-15.09\%$, respectively. Again, improvement in the estimates of $K_u$ and $\omega_u$ can be seen as we decreases the slope toward $k_{min}$ (FIG. 10). This example shows again that $k=1.4 k_{min}$ will lead to quite accurate ultimate gain and ultimate frequency while guarantee the success of the relay feedback test.

With this guideline in the selection of the slope for the saturation-relay, we can devise a procedure to find more accurate $K_u$ and $\omega_u$.

b 5.Procedure

Since $k_{min}$ (or $K_u$) is needed to find the slope of the saturation-relay. The proposed procedure finds a rough estimate of $k_{min}$ first and goes on to find k and obtains a better $K_u$ and $\omega_u$. This procedure is summarized as follows. Consider a relay feedback system.

(1) Select the height of the relay h (upper and lower limits in the manipulated input in the experiment)

(2) 2a. Use an nearly ideal relay to estimate $\hat{K}_u$ ($\hat{K}_u$=4h/πa).

2b. Calculate the slope of the saturation relay k=1.4 $k_{min}$ ($k_{min}=\hat{K}_u$).

2c. Continue the relay feedback experiment using the saturation relay with k=1.4 $k_{min}$.

(3) Find $K_u$ and c from the relay feedback test.

Applications

The proposed saturation-relay feedback is applied to system identification (identifying $K_u$ and $\omega_u$) as well as autotuning multivariable systems. Both linear system and nonlinear process are studied.

Figure 11:
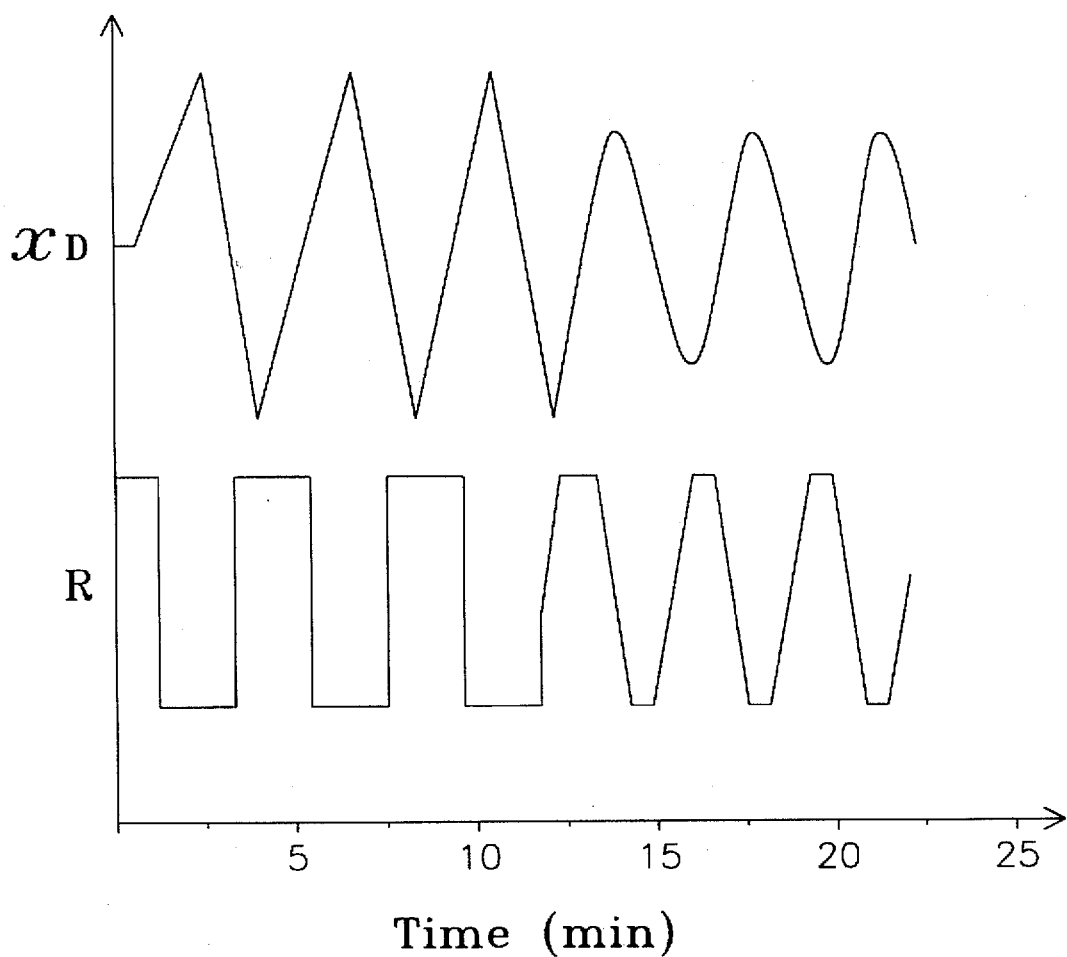

Consider the WB column studied in Example 1. The exact value for $K_u$ and $\omega_u$ are 2.1 and 1.608, respectively. The proposed procedure goes as follows. The relay height h is chosen as 1. Initially, a positive change R is made and $X_D$ starts to increases (FIG. 11). As soon as $X_D$ moves upward, R is moved to the lower position (ΔR=−1). This ideal relay feedback test goes on for 2–3 cycles (e.g., time<11 in FIG. 11) and we can estimate $K_u$ from system responses. The result is $K_u$=1.71 (−18.6% error). With the initial result, the slope of the saturation relay is chosen as k=1.4 $k_{min}$=2.4, then the relay feedback test continues with the saturation relay (e.g., time>11 in FIG. 11). The results show that the ultimate gain and ultimate frequency found from the saturation-relay feedback are 2.098 and 1.606, respective. This corresponds to 0.01% in $K_u$ and 0.012% error in $\omega_u$. Obviously, significant improvement can be made using the proposed procedure.

Figure 12:
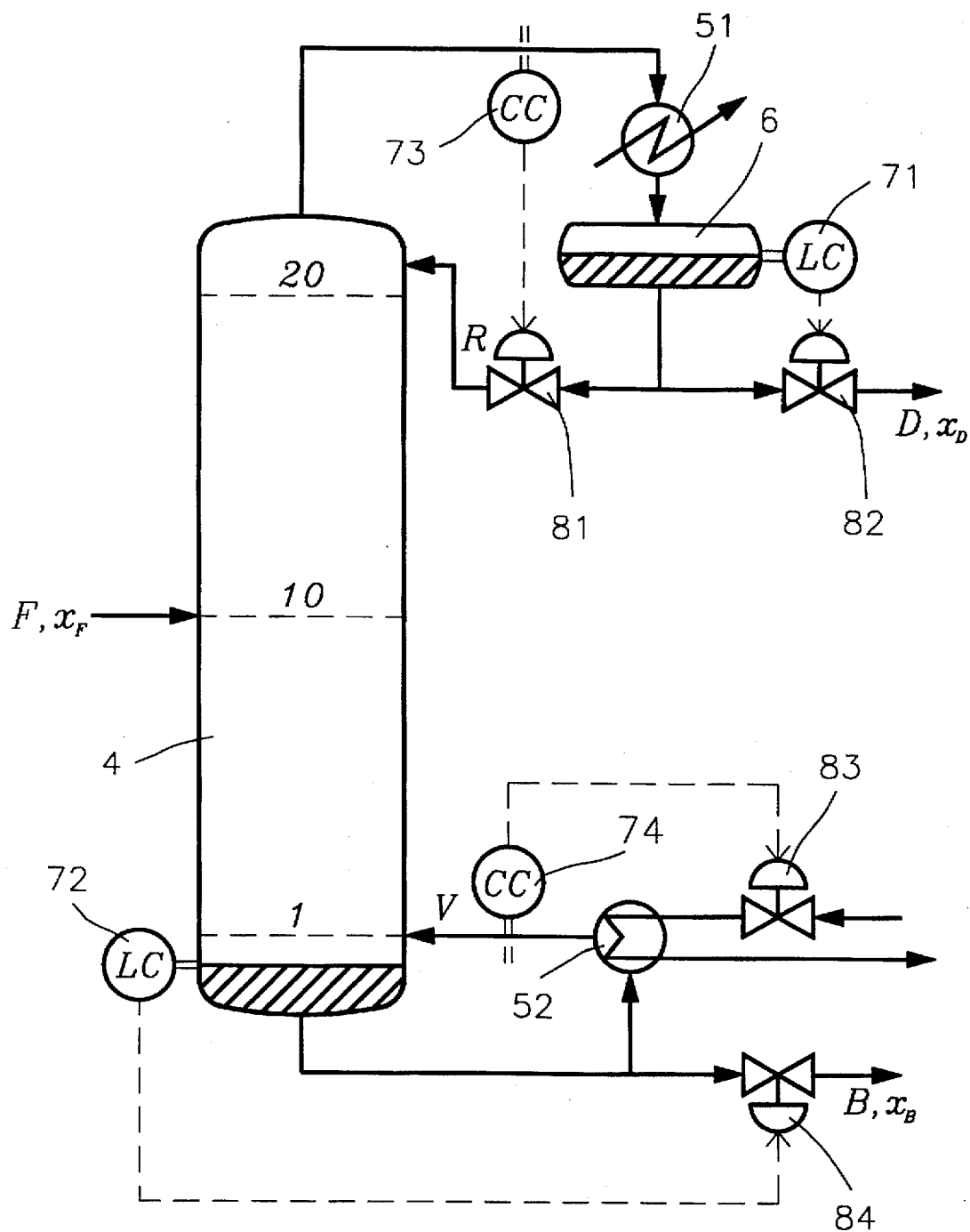

A nonlinear distillation example is used to illustrate the accuracy of the proposed autotune identification procedure. The column studied by Shen and Yu (1992) is a 20-tray distillation column 4. A mixture with feed flow rate F and light component composition $x_F$ is fed to the column 4. During the distillation process, the upper gas in the column 4 is transferred to the condenser 51 to be condensed into liquid, and then the liquid is accumulated in the reflux drum 6. A portion of the liquid is fed back to the column 4 with reflux flow rate R, and the other portion of the liquid, namely, the product flowed from the top of the column 4 (hereafter shown as the top product) with distillation component $x_D$ is outputted. The composition controller 73 detects the composition of the upper gas and controls the valve 81 to adjust the reflux flow rate R while the level controller 71 detects the liquid level in the reflux drum 6 and controls the valve 82 to adjust the distillate flow rate D. After the upper part of the column 4 has been described, please refer to the lower pan of the column 4. A portion of the lower liquid is fed back to the column 4 with vapor boilup rate V after heated by the heat exchanger 52, and the other portion of the lower liquid, namely, the product flowed from the bottom of the column 4 (hereafter shown as bottom product) with bottoms composition $X_B$ is outputted. The composition controller 74 detects the composition of the lower liquid and controls the valve 83 to adjust the flow rate of the hot water inputted into the heat exchanger 52 while the level controller 72 detects the liquid level in the column 4 and controls the valve 84 to adjust the bottoms flow rate B of the bottom product. The product specifications are 98% and 2% of the light component on the top $X_D$ and bottoms $X_B$ of the column 4. The relative volatility is 2.26 with a reflux ratio 1.76. Table I gives the steady-state values. The control objective is to maintain the top and bottoms product compositions $X_D$ and $X_B$ by changing the reflux flow rate (R) and vapor boilup rate (V). This is the conventional R–V control structure (FIG. 12).

Figure 13:
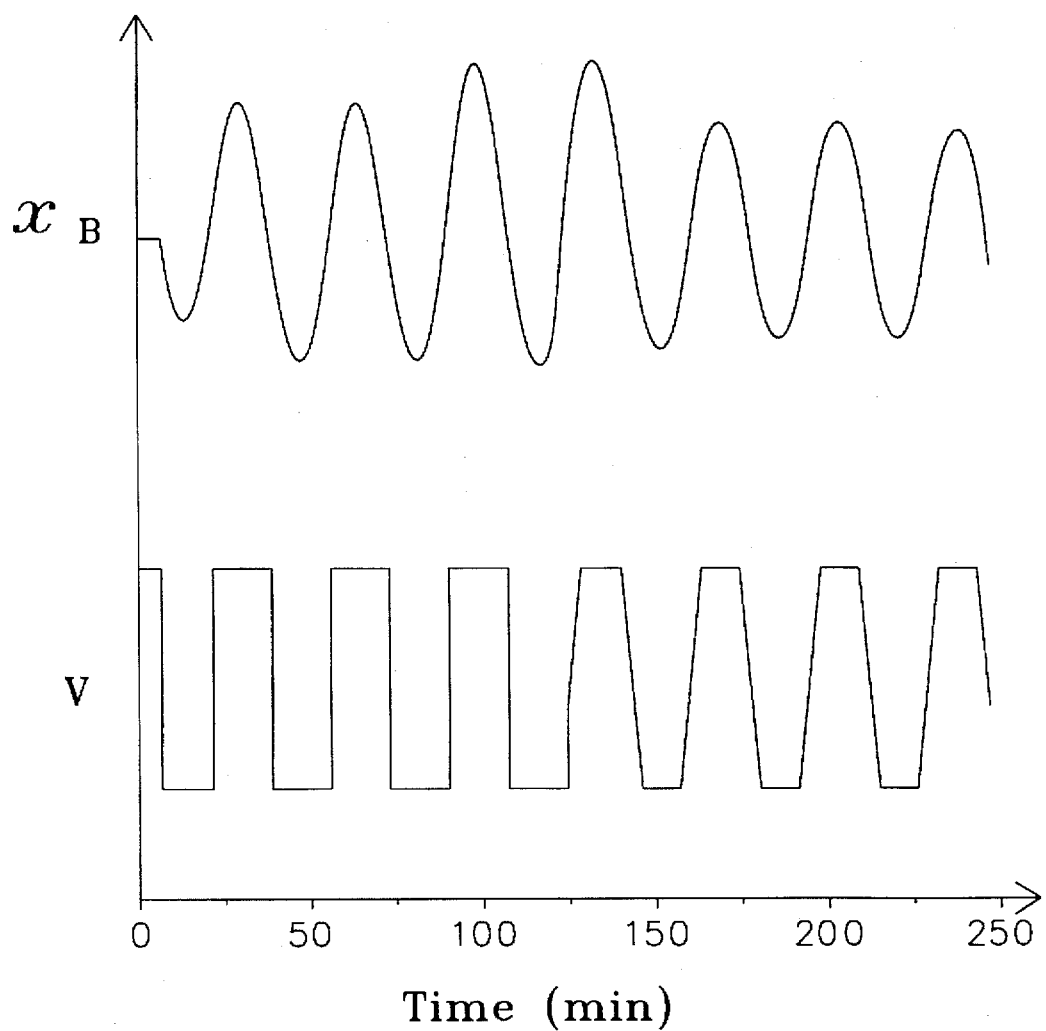

First, the $x_B$–V loop is used to test the accuracy of proposed method in finding $K_u$ and $\omega_u$. FIG. 13 shows the input (V) and output ($x_B$) responses using the proposed autotuning identification with a relay height of 5%. The results show in Table II. compared with the stepping technique, the ideal relay-feedback experiment gives significant errors in $K_u$ and $\omega_u$. On the other hand, saturation-relay feedback with the slope k=1.4 $k_{min}$ (k=704) gives very good estimate in $K_u$ and $\omega_u$. The errors in $K_u$ and $\omega_u$ are −2.8% and −3.3%, respectively.

Next, the saturation-relay feedback is applied to MIMO autotuning of this R–V controlled column. The MIMO autotuning is performed sequentially starting from $X_D$–R loop while keeping $x_B$–V loop on manual. When $K_u$ and $\omega_u$ for the $x_D$–R loop are found the PI controller is tuned according to (Shen and Yu, 1994):

TABLE I

Steady-state values for moderate-purity distillation column

| Parameters | Values |
| --- | --- |
| Number of Trays | 20 |
| Feed Tray | 10 |
| Relative Volatility | 2.26 |
| Operating Pressure (atm) | 1.0 |
| Feed Flow Rate (Kg-mole/min) | 36.3 |
| Distillation Flow Rate (Kg-mole/min) | 18.15 |
| Bottoms Flow Rate (Kg-mole/min) | 18.15 |
| Reflux Ratio | 1.76 |
| Feed Composition (mole fraction) | 0.50 |
| Distillation composition (mole fraction) | 0.98 |
| Bottoms Composition (mole fraction) | 0.02 |

TABLE II

Identification results ($K_u$ and $\omega_u$) in $\chi_B$ − V loop for moderate-purity distillation column

| | $K_u$ | | $\omega_u$ | |
| --- | --- | --- | --- | --- |
| | value | % error | value | % error |
| stepping method | 562.2 | 0 | 0.8162 | 0 |
| ideal relay (k→∞) | 503.2 | −10.5 | 0.1839 | −5.2 |
| saturation relay (k = 704) | 547.1 | −2.8 | 0.1802 | −3.3 |

$$K_c = \frac{K_u}{3} \tag{35}$$

$$\tau_I = \frac{P_u}{0.5} \tag{36}$$

Figure 14:
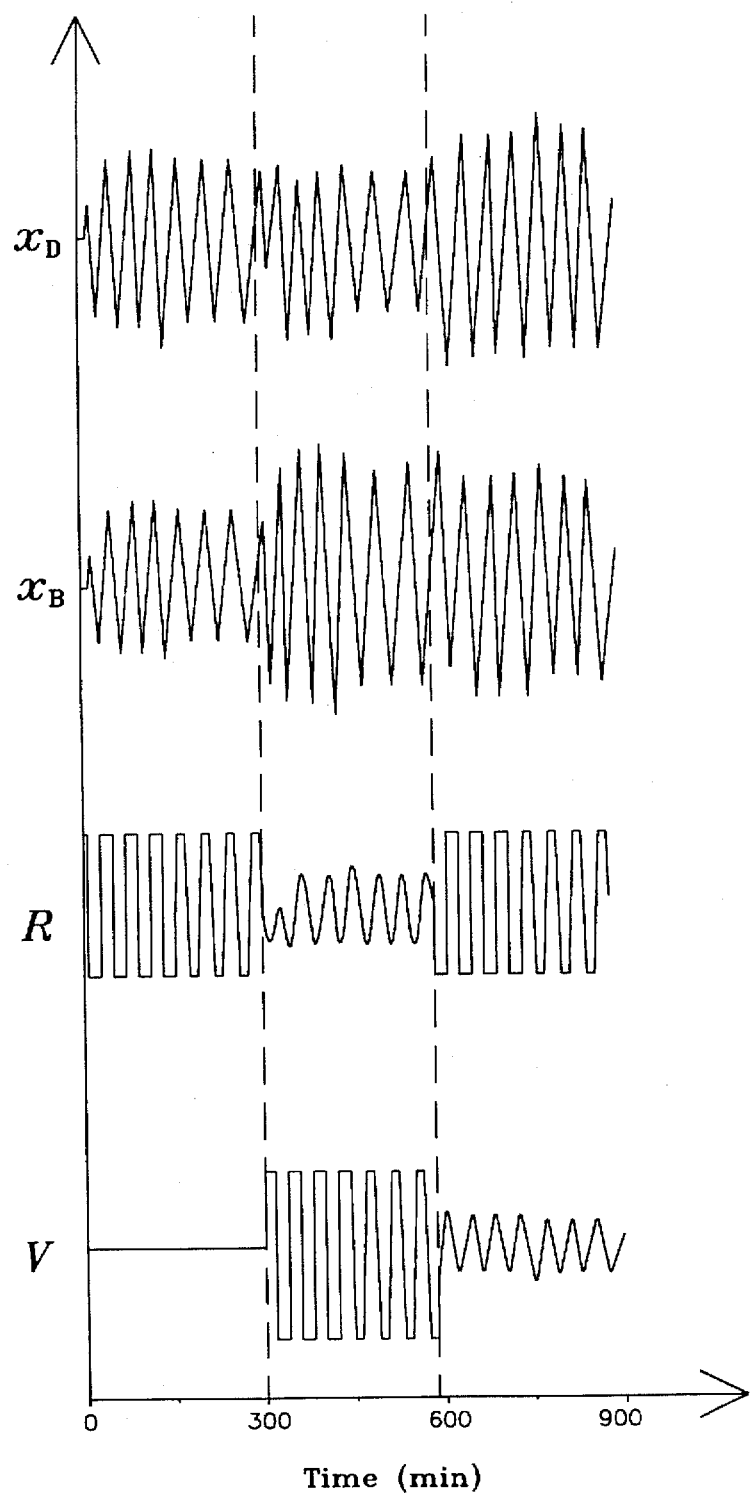
Figure 15A:
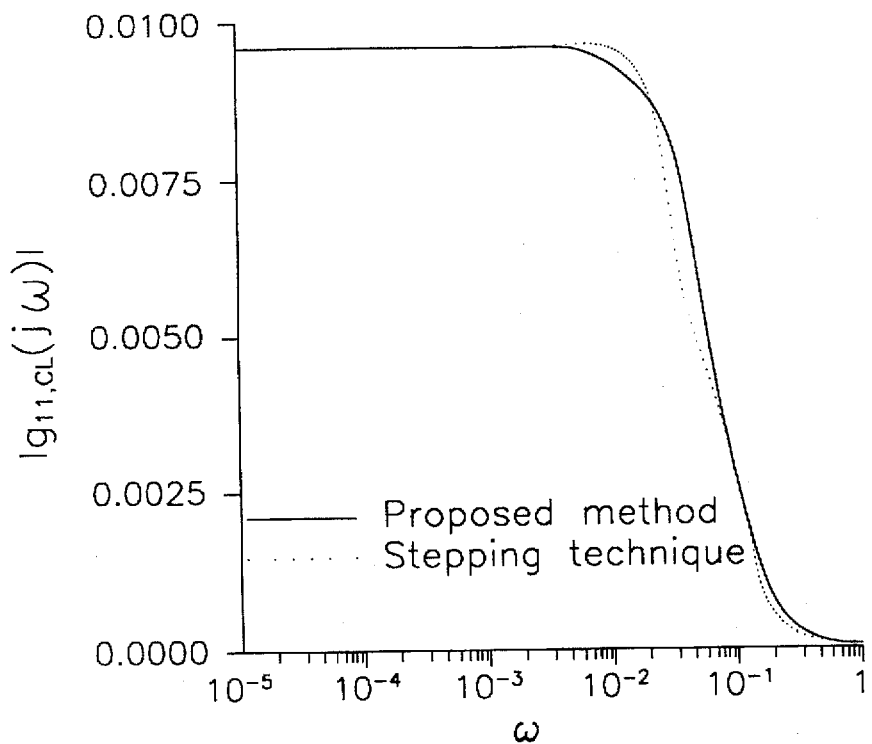
Figure 15B:
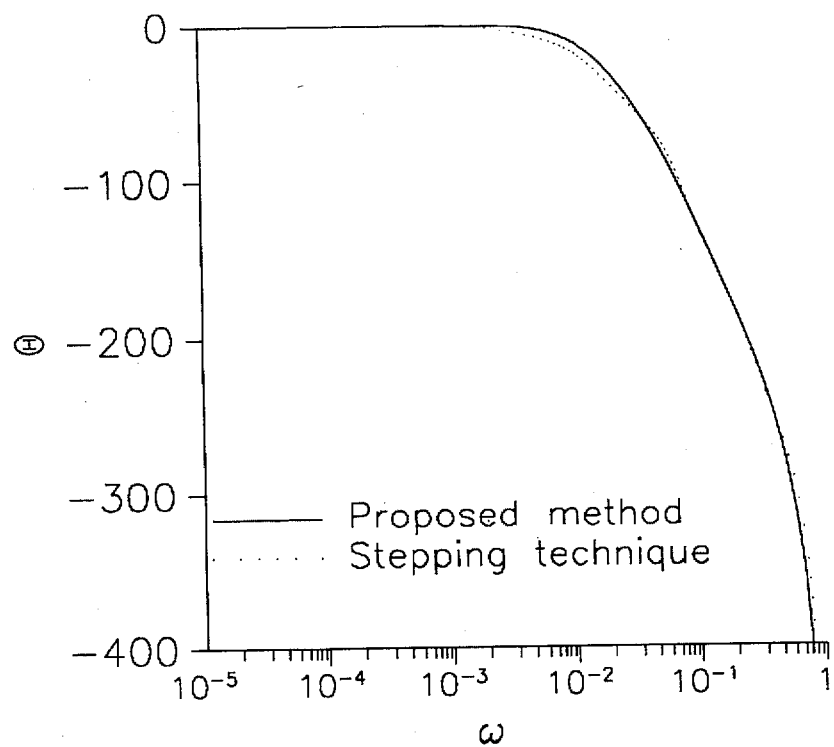
Figure 15C:
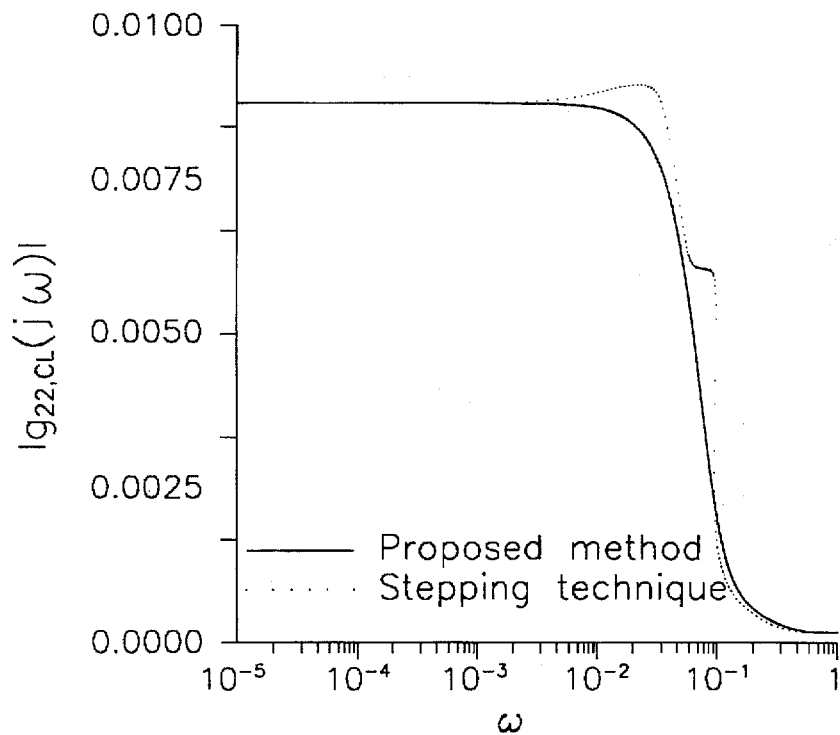
Figure 15D:
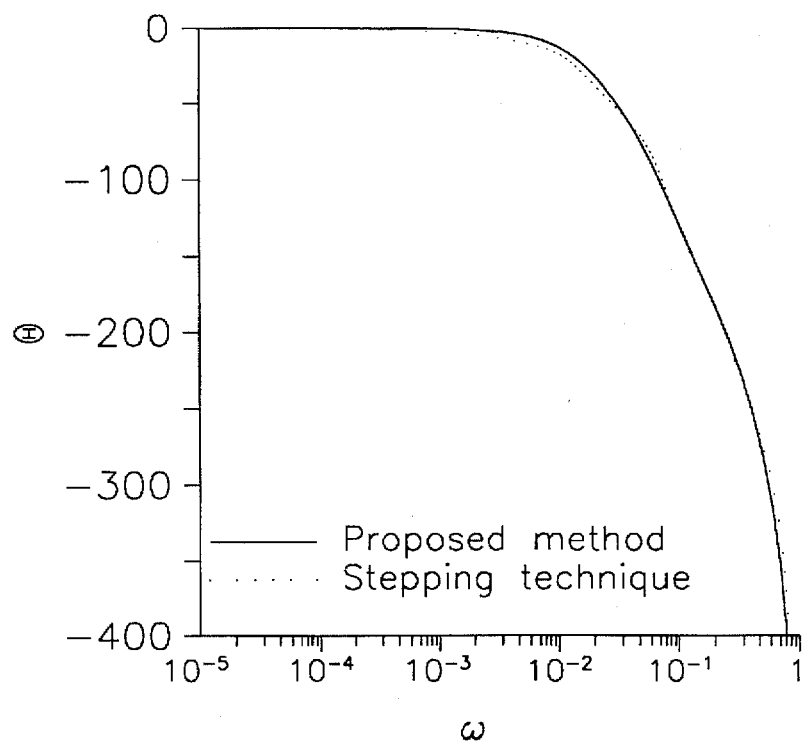

With this set of tuning constants, the $x_D$–R loop is closed and the saturation-relay feedback is perform on $x_B$–V loop. This procedure is repeated until the tuning constants converge. Shen and Yu (1994) give details on this MIMO autotuning procedure. FIG. 14 shows that, it take 2 saturation-relay feedback test to complete the closed-loop transfer functions ($g_{ii,CL}$'s) obtained from different approach are compared.

Let 1 and 2 denote $x_D$ and $x_B$. The closed-loop transfer function for the $x_D$-R loop is:

$$g_{11,CL} = g_{11}\left(1 - \frac{g_{12}g_{21}}{g_{11}g_{22}} \cdot \frac{g_{22}K_2}{1+g_{22}K_2}\right) \quad (37)$$

$K_u$ and $\omega_u$ from saturation-relay feedback (FIG. 14) are used to back-calculated the coefficients of the parametric $g_{ii,CL}$'s and $g_{22,CL}$.

$$g_{11,CL}(s) = \frac{0.00965e^{-6s}}{(9.89s+1)(23s+1)}$$

$$g_{22,CL}(s) = \frac{0.01316e^{-6s}}{(4.7s+1)(24.5s+1)}$$

Figure 16:
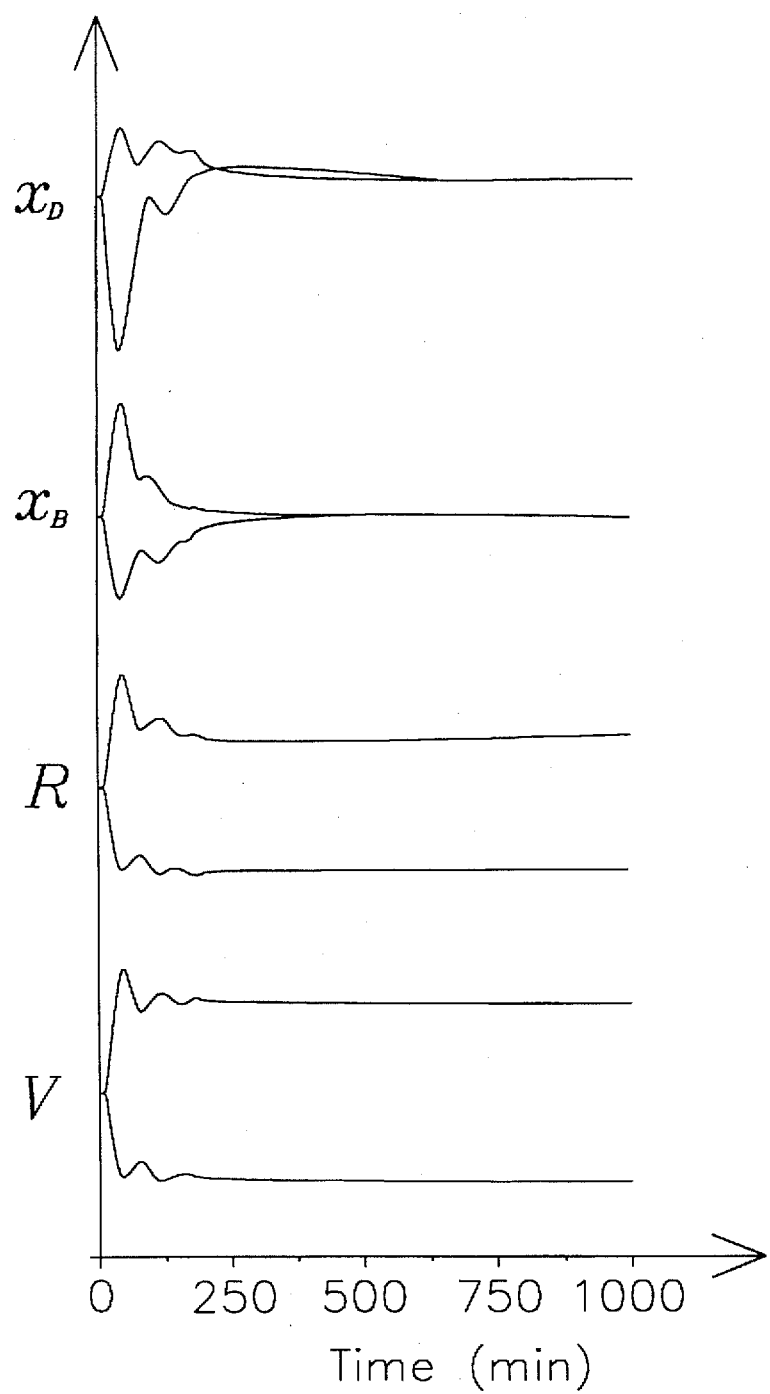

The two closed-loop transfer functions are compared with the frequency responses from the stepping technique. Results (FIGS. 15A–15D) show that the proposed saturation-relay based MIMO autotuning gives every accurate estimates of the process transfer functions as compared to the almost analytical results (results from stepping technique). Furthermore, autotuning based on saturation-relay feedback gives satisfactory closed-loop performance for ±20% changes in feed composition (FIG. 16).

The linear and nonlinear examples as well as identification and autotuning results clearly indicate that the proposed saturation-relay feedback gives significant improvement in finding $K_u$ and $\omega_u$ and, subsequently, lead to improved performance in identification and MIMO autotuning.

In this invention, the saturation-relay feedback system is proposed to improve the accuracy in the estimate of ultimate gain and ultimate frequency. The analyses show that significant improvement in the estimate of $K_u$ and $\omega_u$ can be achieved using saturation-relay feedback. It also shows that too small a slope in the saturation-relay may fail to generate a limit cycle and, subsequently, lead to a failed experiment. A procedure is proposed to overcome the tradeoff between the accuracy and (possible) failure. The proposed method is test on linear and nonlinear systems. The results in system identification and MIMO autotuning show that significant improvement can be achieved. More importantly, the proposed method maintains the simplicity of the conventional relay-feedback system.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar algorithms and structures.

What is claimed is:

1. A method for finding the ultimate properties of a transfer function employed in the autotuning of a PID controller, comprising steps of
   (a) providing a first specific value for said transfer function;
   (b) computing a first ultimate parameter of said transfer function in response to said first specific value;
   (c) modifying said first specific value in response to said first ultimate parameter in order to obtain a second specific value;
   (d) generating a second ultimate parameter for a characteristic of said transfer function in a specified range in response to said second specific value;
   (e) obtaining a precise parameter of said PID controller in response to said second ultimate parameter.

2. A method according to claim 1, wherein said transfer function is denoted by G(s), which is a function obtained by Laplace-transformation and defined in a frequency domain.

3. A method according to claim 1, wherein said first specific value is an amplitude of a square-wave, which is generated from a first nonlinear element.

4. A method according to claim 3, wherein said first nonlinear element is an on/off relay.

5. A method according to claim 4, wherein said first ultimate parameter includes by a rough ultimate gain and a rough ultimate frequency of said transfer function.

6. A method according to claim 5, wherein said first ultimate parameter is obtained according to a continuous cycling calculation.

7. A method according to claim 3, wherein said second specific value is an amplitude of a sine-wave-like wave, which is generated from a second nonlinear element.

8. A method according to claim 7, wherein said second nonlinear element is a saturation relay.

9. A method according to claim 8, wherein said sine-wave-like wave is obtained by appropriate selecting a slope of a ramp portion of a signal.

10. A method according to claim 8, wherein said slope is less than a bounded value $K_{max}$ in order to make a performance of said saturation relay different from that of said on/off relay.

11. A method according to claim 8, wherein said saturation relay is described by a describing function N(a).

12. A method according to claim 11, wherein said second ultimate parameter is obtained by employing said describing function N(a).

13. A method according to claim 12, wherein said describing function is obtained by employing a first term coefficient of a Fourier expansion.

14. A method according to claim 8, wherein said second ultimate parameter includes a precise ultimate gain and a precise ultimate frequency of said transfer function.

15. A method according to claim 14, wherein said sine-wave-like wave generated from said saturation relay is transmitted to said transfer function and said precise ultimate gain and said precise ultimate frequency of said transfer function are obtained according to said limit cycle calculation.

16. A method according to claim 14, wherein said second ultimate parameter is obtained according to a limit cycle calculation.

17. A method according to claim 16, wherein a period of said limit cycle is $P_u$.

18. A method according to claim 16, wherein a first existing condition for said limit cycle is 1+G(jω)N(a)=0.

19. A method according to claim 16, wherein a second existing condition for said limit cycle is that said slope of said sine-wave-like wave generated from said saturation relay is greater than a value $K_{min}$.

20. A method according to claim 7, wherein said first ultimate parameter of said transfer function is transmitted to said second nonlinear element by employing a signal feedback means including a signal feedback line.

21. A method according to claim 8, wherein said second ultimate parameter of said transfer function is transmitted to said PID controller by employing a signal feedback means including a signal feedback line.

22. A method according to claim 21, wherein a selecting switch is employed for switching from causing a feedback by said first ultimate parameter of said transfer function to said nonlinear element into causing a feedback by said second ultimate parameter to said PID controller.

23. A method according to claim 22, wherein said an another selecting switch is also employed for said transfer function in order to replace said first specific value by said second specific value.

24. A method according to claim 23, wherein said first specific value and said second specific value are represented by a square-wave and a sine-wave-like wave, respectively.

25. A method according to claim 1, characterized in that an intersection c located at negative real axis of a complex-plane, is obtained by intersecting the locus of G(jω) derived from said transfer function G(s) with a locus of −1/N(a) derived from said describing function N(a).

26. A method according to claim 25, wherein said specified range is that said locus of G(jω) has to enclose a starting point b of said −1/N(a) locus located at negative real axis of said complex-plane.

27. A method according to claim 1, wherein said first ultimate parameter obtained by computation is used as a reference in order to compute said second ultimate parameter.

28. A method according to claim 1, being used for a system identification.

29. An autotuning apparatus used to modulate a parameter of a PID controller which is employed for controlling a controlled device, comprising;
   said controlled device outputting a first ultimate parameter and a second ultimate parameter, respectively in response to a first input signal and a second input signal;
   a nonlinear element connected to said controlled device, and outputting a first specific signal and a second specific signal in response to a first ultimate parameter; and
   a control unit connected to said nonlinear element, and by means of said nonlinear element outputting said second input signal to cause said controlled device to output to said PID controller said second ultimate parameter for a specific characteristic of said controlled device in a specific range in order to obtain a precise parameter for said PID controller.

30. An autotuning apparatus according to claim 29, wherein said controlled device is a device used in a distillation process.

31. An autotuning apparatus according to claim 29, wherein said first input signal is a square-wave signal which is generated form said nonlinear element.

32. An autotuning apparatus according to claim 31, wherein said nonlinear element is an on/off relay.

33. An autotuning apparatus according to claim 31, wherein said second input signal is a sine-wave-like signal which is generated from said nonlinear element.

34. An autotuning apparatus according to claim 33, wherein said nonlinear element is a saturation relay.

35. An autotuning apparatus according to claim 29, wherein said first ultimate parameter includes a rough ultimate gain and a rough ultimate frequency.

36. An autotuning apparatus according to claim 35, wherein said rough ultimate gain and said rough ultimate frequency are obtained according to a continuous cycle calculation.

37. An autotuning apparatus according to claim 34, wherein said second ultimate parameter includes a precise ultimate gain and a precise ultimate frequency.

38. An autotuning apparatus according to claim 37, wherein said second ultimate parameter is obtained according to a limit cycle calculation.

39. An autotuning apparatus according to claim 38, wherein a sine-wave-like signal generated from said saturation relay is transmitted to said controlled device and said precise ultimate gain and said precise ultimate frequency of said controlled device are obtained according to said limit cycle calculation.

40. An autotuning apparatus according to claim 29, wherein said first ultimate parameter of said controlled device is transmitted to said nonlinear element by a signal feedback apparatus including a signal feedback line.

41. An autotuning apparatus according to claim 29, wherein said second ultimate parameter of said controlled device is transmitted to said PID controller by a signal feedback apparatus including a signal feedback line.

42. An autotuning apparatus according to claim 29, wherein a selecting switch is employed for switching from causing a feedback by said first ultimate parameter of said controlled device to said nonlinear element into causing a feedback by said second ultimate parameter to said PID controller.

43. An autotuning apparatus according to claim 42, wherein said selecting switch is also employed for said controlled device in order to replace said first specific signal by said second specific signal.

44. An autotuning apparatus according to claim 43, wherein said first specific signal and said second specific signal are represented by a square-wave signal and a sine-wave-like signal, respectively.

45. A autotuning apparatus according to claim 29, characterized in that an intersection c located at negative real axis of a complex-plane, is obtained by intersecting the locus of G(ω) function derived from said controlled device with a locus of −1/N(a) derived from said describing function N(a), wherein G(jω) is the transfer function of said controlled device and N(a) is a describing function employed for said nonlinear element.

46. A autotuning apparatus according to claim 45, wherein said specified range is that said the locus of G(jω) has to enclose a starting point b of said −1/N(a) locus located at negative real axis of said complex-plane.

47. An autotuning apparatus according to claim 29, wherein said autotuning apparatus is implemented one selected from a group consisting of a distributed control system (DCS), a single station controller control, and a microcomputer control system.

* * * * *